(12) United States Patent
Nishimoto et al.

(10) Patent No.: US 7,830,773 B2
(45) Date of Patent: Nov. 9, 2010

(54) OPTICAL PICKUP FOR RECORDING AND REPRODUCING INFORMATION WITH A PLURALITY OF TYPES OF OPTICAL INFORMATION RECORDING MEDIUMS

(75) Inventors: Masahiko Nishimoto, Osaka (JP); Yasuyuki Kochi, Osaka (JP); Shinichi Ijima, Osaka (JP); Takuya Okuda, Kyoto (JP); Masayuki Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 489 days.

(21) Appl. No.: 11/667,844

(22) PCT Filed: Sep. 16, 2005

(86) PCT No.: PCT/JP2005/017119

§ 371 (c)(1),
(2), (4) Date: Mar. 28, 2008

(87) PCT Pub. No.: WO2006/054383

PCT Pub. Date: May 26, 2006

(65) Prior Publication Data

US 2009/0034394 A1   Feb. 5, 2009

(30) Foreign Application Priority Data

Nov. 16, 2004   (JP) .............................. 2004-331789

(51) Int. Cl.
*G11B 7/135* (2006.01)
(52) U.S. Cl. .................................................. 369/112.1
(58) Field of Classification Search ............... 369/112.1, 369/112.15
See application file for complete search history.

(56) References Cited

U.S. PATENT DOCUMENTS

| | | | | |
|---|---|---|---|---|
| 5,111,448 A | * | 5/1992 | Komma et al. | ............ 369/44.23 |
| 5,272,690 A | * | 12/1993 | Bargerhuff et al. | ..... 369/112.09 |
| 5,644,413 A | * | 7/1997 | Komma et al. | ............ 369/44.23 |
| 5,687,153 A | * | 11/1997 | Komma et al. | ......... 369/112.12 |
| 6,072,579 A | * | 6/2000 | Funato | ........................ 356/457 |

(Continued)

FOREIGN PATENT DOCUMENTS

EP   1 109 163 A2   6/2001

(Continued)

OTHER PUBLICATIONS

Japanese Office Action issued in Japanese Patent Application No. 2006-544790, dated Jun. 1, 2010.

*Primary Examiner*—Peter Vincent Agustin
(74) *Attorney, Agent, or Firm*—McDermott Will & Emery LLP

(57) ABSTRACT

An optical pickup device in which a hologram element has a plurality of different diffraction directions. In the tracking standard state, the hologram element is divided into six areas by a straight line connecting two strength center points of two light beams, and by two straight lines that are perpendicular to the straight line. By adding the amount of light received by an area demarcated by two straight lines that pass the two strength center points, to the amount of light received by one of two outer areas sandwiching the area depending on the type of the light beam, it is possible to obtain a well-balanced tracking error signal for each of the two light beams.

13 Claims, 19 Drawing Sheets

U.S. PATENT DOCUMENTS

| | | | |
|---|---|---|---|
| 6,137,752 A * | 10/2000 | Sakai | 369/44.23 |
| 6,937,554 B2 * | 8/2005 | Ohuchida | 369/112.15 |
| 6,985,424 B1 | 1/2006 | Nakamura et al. | |
| 2002/0018432 A1 | 2/2002 | Ohuchida | |
| 2003/0016448 A1 | 1/2003 | Takasuka et al. | |
| 2003/0053211 A1 | 3/2003 | Takasuka et al. | |
| 2004/0081043 A1 | 4/2004 | Nishiwaki et al. | |
| 2005/0088948 A1 * | 4/2005 | Ohuchida | 369/112.1 |

FOREIGN PATENT DOCUMENTS

| | | |
|---|---|---|
| EP | 1 184 848 A2 | 3/2002 |
| JP | 8-22624 | 1/1996 |
| JP | 9-245356 | 9/1997 |
| JP | 2001-202638 | 7/2001 |
| JP | 2001-256657 | 9/2001 |
| JP | 2002-56550 | 2/2002 |
| JP | 2002-123952 | 4/2002 |
| JP | 2003-338076 | 11/2003 |
| JP | 2004-47093 | 2/2004 |
| JP | 3518457 | 2/2004 |
| JP | 2004-158169 | 6/2004 |
| WO | WO 01/11615 A1 | 2/2001 |

* cited by examiner

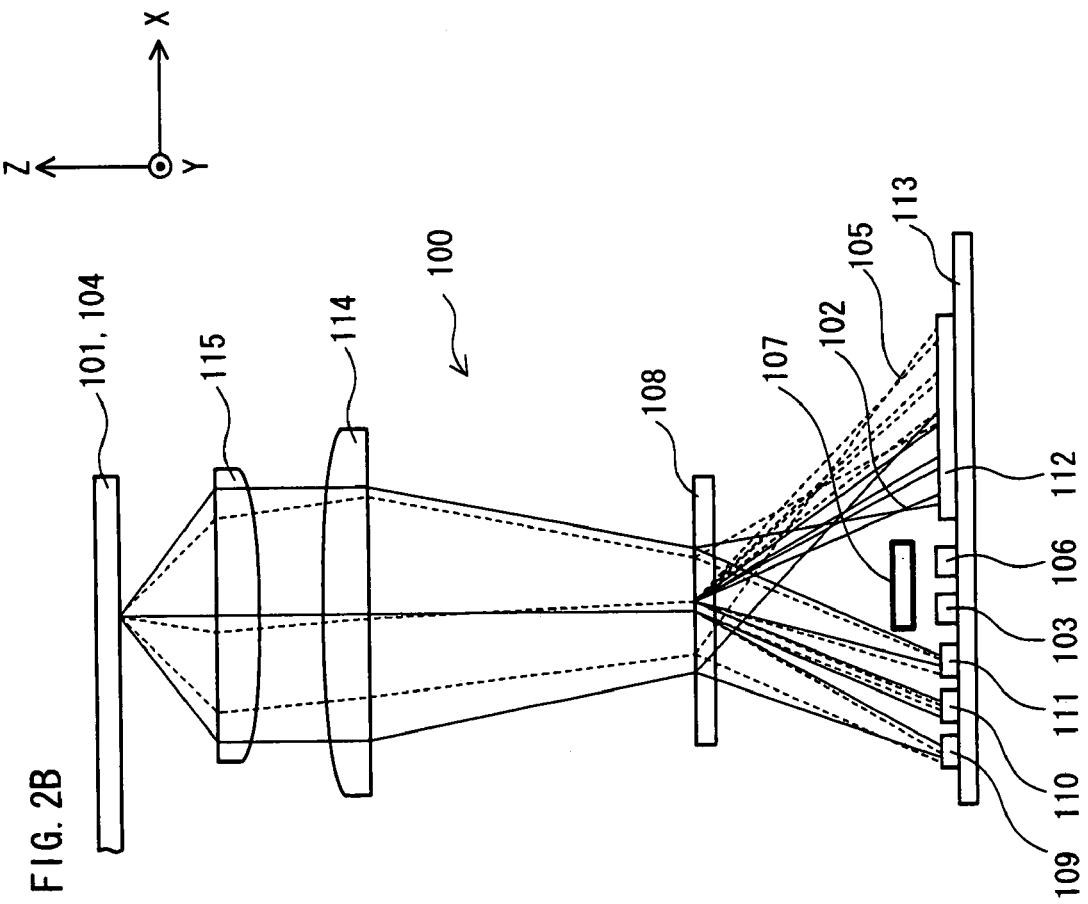
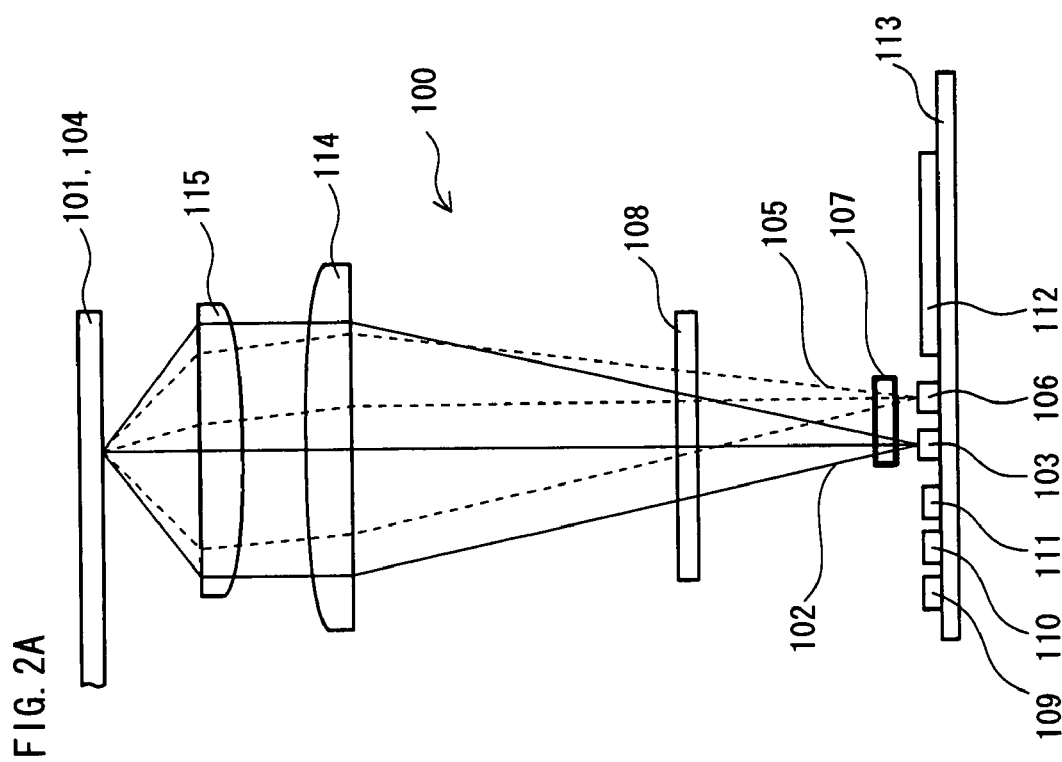
FIG. 2A
FIG. 2B

FIG. 6A

| Diffraction grating 107 | 0 order diffracted light | |
|---|---|---|
| | +1st order diffracted light | −1st order diffracted light |
| Area 116 | L101c | L106d |
| Area 117 | L101d | L106c |
| Area 118 | L102c | L105d |
| Area 119 | L102d | L105c |
| Area 120 | L103c | L104d |
| Area 121 | L103d | L104c |

FIG. 6B

| Diffraction grating 107 | +1st order diffracted light | | −1st order diffracted light | |
|---|---|---|---|---|
| | +1st order diffracted light | −1st order diffracted light | +1st order diffracted light | −1st order diffracted light |
| Area 116 | L101a | L101e | L106b | L106f |
| Area 117 | L101b | L101f | L106a | L106e |
| Area 118 | L102a | L102e | L105b | L105f |
| Area 119 | L102b | L102f | L105a | L105e |
| Area 120 | L103a | L103e | L104b | L104f |
| Area 121 | L103b | L103f | L104a | L104e |

FIG. 7A

| Diffraction grating 107 | 0 order diffracted light | |
|---|---|---|
| | +1st order diffracted light | −1st order diffracted light |
| Area 116 | L201c | L206d |
| Area 117 | L201d | L206c |
| Area 118 | L202c | L205d |
| Area 119 | L202d | L205c |
| Area 120 | L203c | L204d |
| Area 121 | L203d | L204c |

FIG. 7B

| Diffraction grating 107 | +1st order diffracted light | | −1st order diffracted light | |
|---|---|---|---|---|
| | +1st order diffracted light | −1st order diffracted light | +1st order diffracted light | −1st order diffracted light |
| Area 116 | L201a | L201e | L206b | L206f |
| Area 117 | L201b | L201f | L206a | L206e |
| Area 118 | L202a | L202e | L205b | L205f |
| Area 119 | L202b | L202f | L205a | L205e |
| Area 120 | L203a | L203e | L204b | L204f |
| Area 121 | L203b | L203f | L204a | L204e |

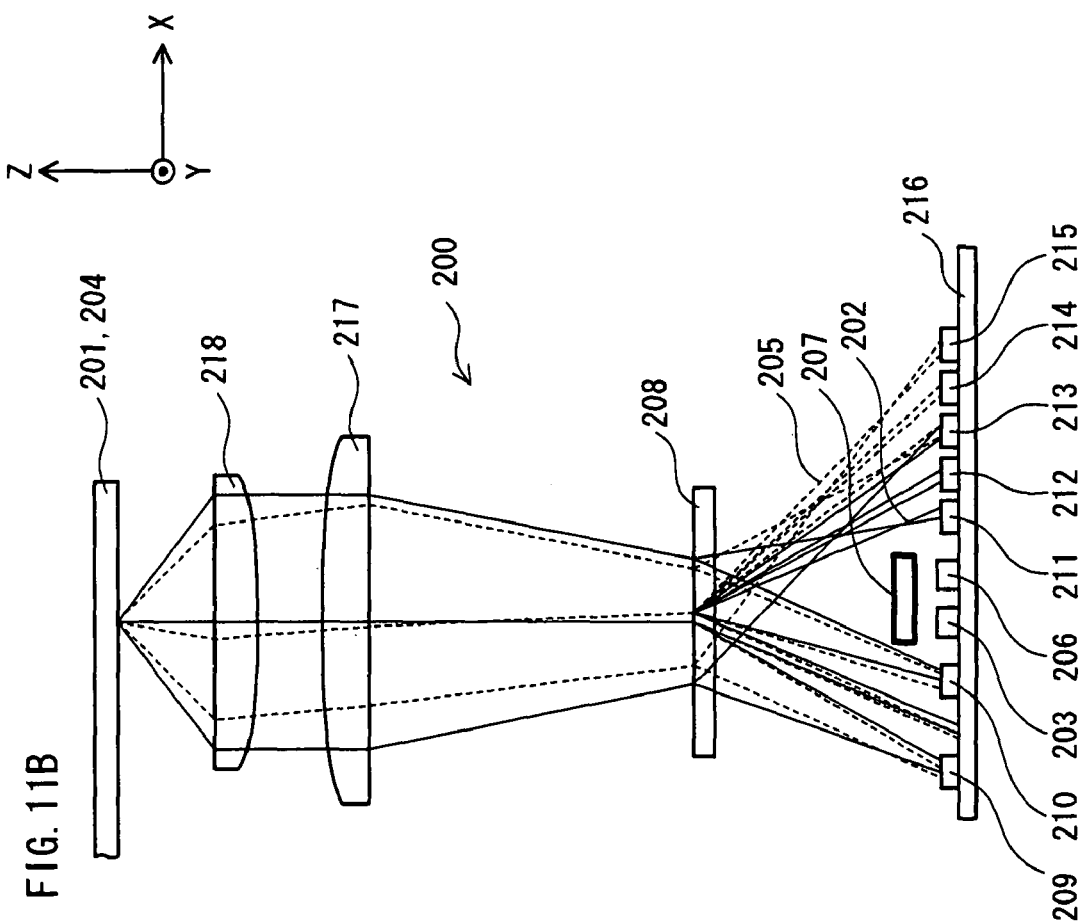
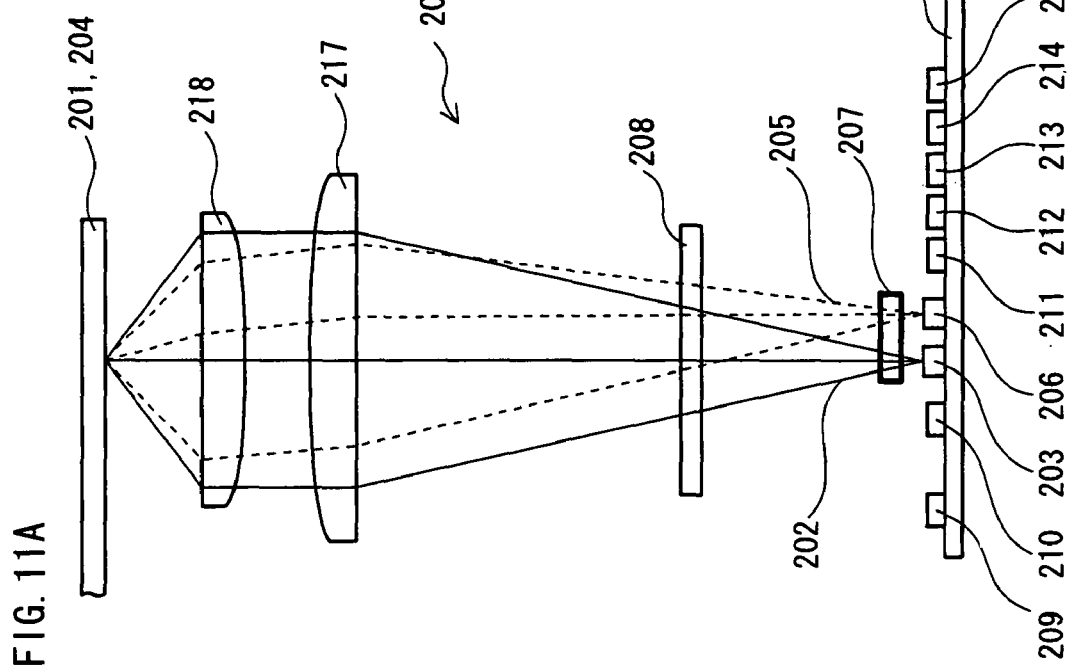

FIG. 14A

| Diffraction grating 107 | 0 order diffracted light | |
|---|---|---|
| | +1st order diffracted light | −1st order diffracted light |
| Area 219 | L1101c | L1106d |
| Area 220 | L1101d | L1106c |
| Area 221 | L1102c | L1105d |
| Area 222 | L1102d | L1105c |
| Area 223 | L1103c | L1104d |
| Area 224 | L1103d | L1104c |

FIG. 14B

| Diffraction grating 107 | +1st order diffracted light | | −1st order diffracted light | |
|---|---|---|---|---|
| | +1st order diffracted light | −1st order diffracted light | +1st order diffracted light | −1st order diffracted light |
| Area 219 | L1101a | L1101e | L1106b | L1106f |
| Area 220 | L1101b | L1101f | L1106a | L1106e |
| Area 221 | L1102a | L1102e | L1105b | L1105f |
| Area 222 | L1102b | L1102f | L1105a | L1105e |
| Area 223 | L1103a | L1103e | L1104b | L1104f |
| Area 224 | L1103b | L1103f | L1104a | L1104e |

FIG. 15A

| Diffraction grating 107 | 0 order diffracted light | |
|---|---|---|
| | +1st order diffracted light | −1st order diffracted light |
| Area 219 | L1201c | L1206d |
| Area 220 | L1201d | L1206c |
| Area 221 | L1202c | L1205d |
| Area 222 | L1202d | L1205c |
| Area 223 | L1203c | L1204d |
| Area 224 | L1203d | L1204c |

FIG. 15B

| Diffraction grating 107 | +1st order diffracted light | | −1st order diffracted light | |
|---|---|---|---|---|
| | +1st order diffracted light | −1st order diffracted light | +1st order diffracted light | −1st order diffracted light |
| Area 219 | L1201a | L1201e | L1206b | L1206f |
| Area 220 | L1201b | L1201f | L1206a | L1206e |
| Area 221 | L1202a | L1202e | L1205b | L1205f |
| Area 222 | L1202b | L1202f | L1205a | L1205e |
| Area 223 | L1203a | L1203e | L1204b | L1204f |
| Area 224 | L1203b | L1203f | L1204a | L1204e |

OPTICAL PICKUP FOR RECORDING AND REPRODUCING INFORMATION WITH A PLURALITY OF TYPES OF OPTICAL INFORMATION RECORDING MEDIUMS

RELATED APPLICATIONS

This application is the U.S. National Phase under 35 U.S.C. §371 of International Application No. PCT/JP2005/017119 filed on Sep. 16, 2005, which in turn claims the benefit of Japanese Application No. 2004-331789, filed on Nov. 16, 2004, the disclosures of which Applications are incorporated by reference herein.

TECHNICAL FIELD

The present invention relates to an optical pickup device for recording and reproducing information with a plurality of types of optical information recording mediums by outputting selectively two light beams of different wavelengths, and more specifically relates to a technology for obtaining high-accuracy tracking error signals in a stable manner from both light beams of the different wavelengths.

BACKGROUND ART

Currently, Compact Discs (CDs) have the largest market among various optical information recording mediums. CDs are recorded or reproduced with use of near-infrared semiconductor lasers whose wavelength is in a range of 780 nm to 820 nm. Digital Versatile Discs (DVDs) which have spread rapidly, are recorded or reproduced with use of red semiconductor lasers whose wavelength is even shorter and is in a range of 635 nm to 680 nm to make the light spot smaller.

From the market there is a demand for a drive device that can reproduce both the two types of optical information recording mediums conforming to different standards. Conventionally, a reproduction-dedicated optical pickup device, shown in FIG. 1, has been proposed (see, for example, Document 1). The operation principle of the conventional optical pickup device is as follows.

As shown in FIG. 1, an optical pickup device 2 includes light sources 3 and 4, a hologram element 7, a light receiving element substrate 14, and a reflection mirror 15, and reads information from an optical information recording medium 1. The light source 3 conforms to the DVD standard, and emits a laser light beam having 650 nm of wavelength. The light source 4 conforms to the CD standard, and emits a laser light beam having 780 nm of wavelength.

The reflection mirror 15 guides laser light beams emitted from the light sources 3 and 4 to the optical information recording medium 1. The hologram element 7 diffracts, by diffraction areas 5 and 6 thereof, laser light beams reflected from the optical information recording medium 1. The light receiving element substrate 14 includes light receiving elements 8-13, and receives light beams diffracted by the hologram element 7.

A laser light beam emitted from the light source 3 enters the light receiving elements 8-11. From output signals of the light receiving elements 8-11, a focus error signal is detected by the Spot Size Detection (SSD) method, a tracking error signal is detected by the Differential Phase Detection (DPD) method, and a reproduction signal is detected.

The laser light beam emitted from the light source 4 enters the light receiving elements 8, 9, 12, and 13. From output signals of the light receiving elements 8, 9, 12, and 13, a focus error signal is detected by the Spot Size Detection method, a tracking error signal is detected by the 3-beam method or the Push-Pull (PP) method, and a reproduction signal is detected.

It should be noted here that a write once read many CD (CD-R) can also be reproduced using the light source 3.

Document 1: Japanese Patent Publication No. 3518457

DISCLOSURE OF THE INVENTION

The Problems the Invention is Doing to Solve

However, according to the optical pickup device 2, only the main light beam of one of the light beams emitted from the light sources 3 and 4 can pass through the center of the hologram element 7. The other light beam, whose main light beam cannot pass through the center of the hologram element 7 causes an unbalance in the amount of light, between the light beams diffracted by the hologram element 7, even if there is no tracking error.

In the push-pull method, a tracking error is detected from an unbalance in the amount of light between the light beams reflected from the optical information recording medium 1. As a result, a very complicated process is required to detect a tracking error accurately when the push-pull method is adopted in the conventional technology. Also, in the differential phase detection method, a tracking error is detected from a phase difference between the diffracted light beams. Accordingly, it is difficult to detect a tracking error in a stable manner when the differential phase detection method is adopted in the conventional technology.

Furthermore, a tracking control by, for example, the Differential Push-Pull (DPP) method is required when information is recorded on an optical information recording medium. In the differential push-pull method, a tracking error is detected from an unbalance in the amount of light between the 0 order diffracted light beam and the $\pm 1^{st}$ order diffracted light beams output from the hologram element 7. The optical pickup device 2 does not have a structure for performing the process by the differential push-pull method.

An object of the present invention is therefore to provide an optical pickup device for recording and reproducing information with a plurality of types of optical information recording mediums by outputting selectively two light beams of different wavelengths, where the optical pickup device can obtain high-accuracy tracking error signals in a stable manner from both light beams of the different wavelengths.

Means to Solve the Problems

The above-described object is fulfilled by an optical pickup device for recording and reproducing information on either of different optical information recording mediums, using light beams of different wavelengths according to types of the recording mediums, comprising: a semiconductor laser element operable to output selectively two light beams of different wavelengths; a hologram element operable to diffract light beams reflected from an optical information recording medium; six light receiving elements operable to receive light beams diffracted by the hologram element and perform a photoelectric conversion on the received light beams; and an output circuit operable to generate a tracking error signal from signals output from the light receiving elements, and output the generated tracking error signal, wherein the light beams reflected from the optical information recording mediums have strength centers thereof, respectively at two different points on the hologram element in correspondence with the different wavelengths, the hologram element is divided into six areas by a straight line connecting the two strength center points, and by two straight lines that are perpendicular to the straight line and respectively pass the two strength center points, and light beams diffracted by the six areas of the hologram element are respectively received by the six light receiving elements in a one-to-one correspondence with each other.

Effects of the Invention

With the above-stated structure, in the tracking standard state, four areas of the hologram element receive an equivalent amount of light reflected from the optical information recording mediums, for each of the optical information recording mediums, where the hologram element is divided into the four areas by the straight line connecting the two strength center points, and by one of the two straight lines that is perpendicular to the straight line and passes one of the two strength center points in correspondence with a type of one of the optical information recording mediums that is currently reflecting a light beam.

Accordingly, in the tracking standard state, it is possible to generate a well-balanced, high-accuracy tracking error signal from signals each of which is obtained by adding together signals from light receiving elements, which have received light beams diffracted by a different one of the four areas of the hologram element.

As described above, due to the characteristic shape of the hologram element, the optical pickup device of the present invention can obtain well-balanced, high-accuracy tracking error signals in a stable manner, merely by adding signals from appropriate light receiving elements according to the type of one of the optical information recording mediums that is currently reflecting a light beam, to signals from an area of the hologram element sandwiched by the two straight lines that are perpendicular to the straight line connecting the two strength center points and respectively pass the two strength center points.

The above-stated optical pickup device may further comprise: a diffraction grating operable to diffract light beams into 0 order diffracted light beams, $+1^{st}$ order diffracted light beams, and $-1^{st}$ order diffracted light beams, on light paths from the semiconductor laser element to the optical information recording medium; and three tracking light receiving elements operable to receive diffracted light beams from the hologram element that are generated by the hologram element by diffracting $\pm 1^{st}$ order diffracted light beams reflected from the optical information recording medium, and perform a photoelectric conversion on the received diffracted light beams, wherein the $\pm 1^{st}$ order diffracted light beams are diffracted by three areas of the hologram element and then diffracted light beams output from the three areas enter the three light receiving elements in a one-to-one correspondence with each other, wherein the hologram element is divided into the three areas by the two straight lines that are perpendicular to the straight line connecting the two strength center points and pass the two strength center points, respectively.

In the above-stated optical pickup device, the diffraction grating may be divided into a central portion and outer portions by two straight lines that are substantially parallel to each other, the central portion has higher diffraction efficiency of the 0 order diffracted light beams than the outer portions, and gratings formed in the outer portions meet the two straight lines obliquely.

With the above-described structure, a tracking error signal can be obtained from the 0 order diffracted light beam and the $\pm 1^{st}$ order diffracted light beams, with respect to each type of light beam. This enables the tracking control to be performed by the differential push-pull method using the tracking error signal.

Especially, it is possible to increase the strength of each main beam by setting, for each main beam, the diffraction efficiency of the central portion of the diffraction grating to be larger than that of the outer portions. This increases the efficiency in recording and reproducing information.

In the above-stated optical pickup device, the output circuit may generate the tracking error signal from signals each of which is obtained by adding together signals from light receiving elements, which have received light beams diffracted by a different one of four areas of the hologram element, wherein the hologram element is divided into the four areas by the straight line connecting the two strength center points, and by one of the two straight lines that is perpendicular to the straight line and passes one of the two strength center points in correspondence with a type of one of the optical information recording mediums that is currently reflecting a light beam.

In the above-stated optical pickup device, the output circuit may generate the tracking error signal from (i) a signal that is obtained by adding together signals from light receiving elements, which have received light beams diffracted by four areas of the hologram element, wherein the hologram element is divided into the four areas by the straight line connecting the two strength center points, and by one of the two straight lines that is perpendicular to the straight line and passes one of the two strength center points depending on a type of one of the optical information recording mediums that is currently reflecting a light beam, and (ii) a signal that is obtained by adding together signals from tracking light receiving elements, which have received light beams diffracted by two areas of the hologram element, wherein the hologram element is divided into the two areas by one of the two straight lines that is perpendicular to the straight line and passes one of the two strength center points depending on a type of one of the optical information recording mediums that is currently reflecting a light beam.

With the above-stated structure, appropriately added-up signals are obtained from the output circuit for each type of light beam, thus the addition needs not be performed by an external circuit.

The above-stated optical pickup device may further comprise focusing light receiving elements operable to receive $-1^{st}$ order diffracted lights from the hologram element that are generated by the hologram element by diffracting the 0 order diffracted light beams that are generated by the diffraction grating by diffracting the light beams, and to perform a photoelectric conversion on the received $-1^{st}$ order diffracted lights, wherein the output circuit generates a focus error signal from signals output from the focusing light receiving elements, and outputs the generated focus error signal.

In the above-stated optical pickup device, each of the six areas of the hologram element may be divided into two types of partial areas that have different diffraction angles, the two types of partial areas form beam spots that are symmetrical with respect to a light emission point of the semiconductor laser element, and the focusing light receiving elements receive light beams to form beam spots that are symmetrical with beam spots formed on the six light receiving elements with respect to the light emission point of the semiconductor laser element.

With the above-stated structure, it is possible to perform the focus control using, among the diffracted light beams obtained from the hologram element, diffracted light beams that are not used in the tracking control.

Especially, the symmetric property of the spot shape is increased by the structure in which the focusing light receiving elements receive images that are symmetrical with images received by the light receiving elements with respect to the light emission point of the semiconductor laser element. Accordingly, this reduces the detection error attributed to the asymmetry of the spot shape, when the spot side detection method is used.

The above-stated optical pickup device may further comprise a switch circuit that is used to add together: (i) for each of four areas of the hologram element, signals from light receiving elements which have received light beams diffracted by the four areas, wherein the hologram element is divided into the four areas by the straight line connecting the two strength center points, and by one of the two straight lines that is perpendicular to the straight line and passes one of the two strength center points depending on a type of one of the optical information recording mediums that is currently reflecting a light beam, and (ii) for each of two areas of the hologram element, signals from tracking light receiving elements which have received light beams diffracted by the two areas, wherein the hologram element is divided into the two areas by one of the two straight lines that is perpendicular to the straight line and passes one of the two strength center points depending on a type of one of the optical information recording mediums that is currently reflecting a light beam.

With the above-described structure, the advantageous effects described above can be obtained.

In the above-stated optical pickup device, light receiving elements and tracking light receiving elements, which receive light beams diffracted by an area of the hologram element sandwiched by the two straight lines that are perpendicular to the straight line connecting the two strength center points and respectively pass the two strength center points, maybe separated into different portions in correspondence with types of the optical information recording mediums.

With the above-described structure, the light receiving elements, which receive light beams diffracted by the area of the hologram element sandwiched by the two straight lines that are perpendicular to the straight line connecting the two strength center points, are separated into different portions in correspondence with types of the optical information recording mediums. This makes it possible to obtain signals for each type of laser beam. When this happens, a switch circuit is not required to add signals for each type of the optical information recording mediums. As a result, the circuit structure can be simplified, and an appropriate tracking error signal can be obtained for each type of the optical information recording mediums.

The above-stated optical pickup device may further comprise a collimator lens operable to collimate light beams, wherein an optical axis of the collimator lens passes one of the strength centers which are held on the hologram element by the light beams reflected from the optical information recording medium.

With the above-described structure, the optical axis of the collimator lens matches the main light beam of one of the two light beams. This makes it possible to simplify, to some extent, the process of adjusting the optical axis of the present optical pickup device with the optical axis of the collimator lens.

In the above-stated optical pickup device, the light receiving elements and the semiconductor laser element may be provided on an integrated circuit substrate.

In the above-stated optical pickup device, the semiconductor laser element may be a monolithic 2-wavelength semiconductor laser element, and has been formed on the integrated circuit substrate by a semiconductor process.

With the above-described structures, the semiconductor laser element and the light receiving elements are provided on the same integrated circuit substrate. This makes it possible provide an optical pickup device, in which the semiconductor laser element and the light receiving elements are aligned with high accuracy, to the users.

Especially, by forming both the semiconductor laser element and the light receiving elements in the semiconductor process, it is possible to manage the alignment and the light beam emission interval of both with a high accuracy, namely, with the measurement accuracy of the semiconductor process.

In the above-stated optical pickup device, the integrated circuit substrate, the hologram element, and the diffraction grating may be loaded in one package.

With the above-described structures, it is possible provide an optical pickup device, in which even the hologram element and the diffraction grating are aligned with high accuracy, to the users. Also, providing a plurality of optical components in one package reduces the number of optical components that are to be managed by the user, thus contributes to the reduction of the assembly cost.

BRIEF DESCRIPTION OF THE DRAWING

FIGS. 2A and 2B are schematic views of an optical pickup device. FIG. 2A shows light paths on the approach route of the light beams. FIG. 2B shows light paths on the return route of the light beams.

FIG. 6A is a table indicating the spots that are formed by the $\pm 1^{st}$ order diffracted lights output from the areas 116-121 of the hologram element 108 after diffraction of the 0 order diffracted light 102$m$, which is output from the diffraction grating 107 after diffraction of the light beam 102. FIG. 6B is a table indicating the spots that are formed by the $\pm 1^{st}$ order diffracted lights output from the areas 116-121 of the hologram element 108 after diffraction of the $\pm 1^{st}$ order diffracted lights 102$s$1 and 102$s$2, which are output from the diffraction grating 107 after diffraction of the light beam 102.

FIG. 7A is a table indicating the spots that are formed by the $\pm 1^{st}$ order diffracted lights output from the areas 116-121 of the hologram element 108 after diffraction of the 0 order diffracted light 105$m$, which is output from the diffraction grating 107 after diffraction of the light beam 105. FIG. 7B is a table indicating the spots that are formed by the $\pm 1^{st}$ order diffracted lights output from the areas 116-121 of the hologram element 108 after diffraction of the $\pm 1^{st}$ order diffracted lights 105$s$1 and 105$s$2, which are output from the diffraction grating 107 after diffraction of the light beam 105.

FIGS. 11A and 11B are schematic views of an optical pickup device. FIG. 11A shows light paths on the approach route of the light beams. FIG. 11B shows light paths on the return route of the light beams.

FIG. 14A is a table indicating the spots that are formed by the ±1$^{st}$ order diffracted lights output from the areas 219-224 of the hologram element 208 after diffraction of the 0 order diffracted light 202m, which is output from the diffraction grating 207 after diffraction of the light beam 202. FIG. 14B is a table indicating the spots that are formed by the ±1$^{st}$ order diffracted lights output from the areas 219-224 of the hologram element 208 after diffraction of the ±1$^{st}$ order diffracted lights 202s1 and 202s2, which are output from the diffraction grating 207 after diffraction of the light beam 202.

FIG. 15A is a table indicating the spots that are formed by the ±1$^{st}$ order diffracted lights output from the areas 219-224 of the hologram element 208 after diffraction of the 0 order diffracted light 205m, which is output from the diffraction grating 207 after diffraction of the light beam 205. FIG. 15B is a table indicating the spots that are formed by the ±1$^{st}$ order diffracted lights output from the areas 219-224 of the hologram element 208 after diffraction of the ±1$^{st}$ order diffracted lights 205s1 and 205s2, which are output from the diffraction grating 207 after diffraction of the light beam 205.

Figure 1:
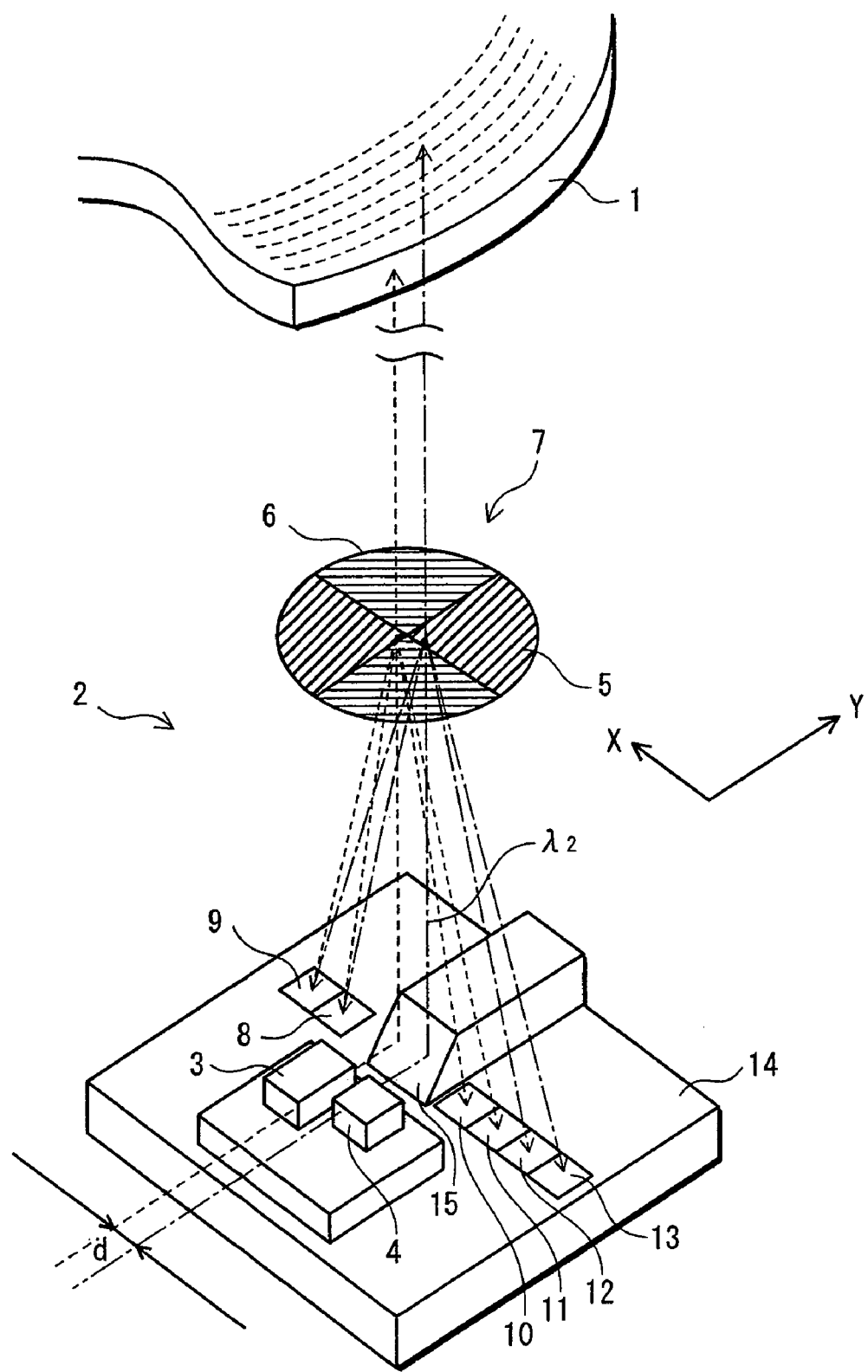
FIG. 1 is a schematic view of a conventional optical pickup device.

DESCRIPTION OF CHARACTERS 100 optical pickup device
101,104 optical information recording medium
102, 150 light beam
103,106 semiconductor laser
107 diffraction grating
108 hologram element
109-112 light receiving element group
109a-109d, 110a-110d, 111a-111d, 112a-112e light receiving element
113 integrated circuit substrate
114 collimator lens
115 objective lens
102m, 105m 0 order diffracted light
102s1 105s1 +1$^{st}$ order diffracted light
102s2, 105s2 −1$^{st}$ order diffracted light
116-121 area
116a-121a positive area
116b-121b negative area
501 central portion of diffraction grating 107
502 outer portion of diffraction grating 107
601-611 current/voltage amplification conversion circuit
701-703 switch circuit

BEST MODE FOR CARRYING OUT THE INVENTION

Embodiment 1

An optical pickup device in Embodiment 1 of the present invention will be described with reference to the attached drawings.

(1) Entire Structure

FIGS. 2A and 2B schematically show the entire structure of the optical pickup device in Embodiment 1 of the present invention.

As shown in FIGS. 2A and 2B, an optical pickup device 100 includes semiconductor lasers 103 and 106, a diffraction grating 107, a hologram element 108, light receiving element groups 109, 110, 111 and 112, an integrated circuit substrate 113, a collimator lens 114, and an objective lens 115.

The semiconductor laser 103 emits a light beam 102 having a wavelength adapted to recording and reproducing data with an optical information recording medium 101. The semiconductor laser 106 emits a light beam 105 having a wavelength adapted to recording and reproducing data with an optical information recording medium 104. It should be noted here that the wavelength of the light beam 102 is shorter than that of the light beam 105.

The diffraction grating 107 diffracts the light beams 102 and 105 into 0 order diffracted light (main beam), +1$^{st}$ order diffracted light (sub beam) and −1$^{st}$ order diffracted light (sub beam). The hologram element 108 diffracts the light beams 102 and 105 that were reflected on the optical information recording mediums 101 and 104, respectively. The light receiving element groups 109-112 receive diffracted light that comes after diffraction by the hologram element 108, and perform a photoelectric conversion on the received diffracted light.

An output circuit (not illustrated) is also loaded on the integrated circuit substrate 113, as well as the semiconductor lasers 103 and 106, diffraction grating 107, hologram element 108, and light receiving element groups 109-112. The collimator lens 114 collimates the light beams 102 and 105. The objective lens 115 concentrates the light beams 102 and 105 on the optical information recording mediums 101 and 104, respectively.

The optical pickup device 100 also includes an optical information recording medium identifying unit that identifies the type of the optical information recording medium. The optical pickup device 100 determines which of the semiconductor lasers 103 and 106 to drive, based on the type of the optical information recording medium identified by the optical information recording medium identifying unit.

FIG. 2A shows light paths of the light beams 102 and 105 from the semiconductor lasers 103 and 106 to the optical information recording mediums 101 and 104, respectively. FIG. 2B shows light paths of the light beams 102 and 105 from the optical information recording mediums 101 and 104 to the light receiving element groups 109-112, respectively.

The X, Y and Z axes shown in the drawings respectively represent the radial direction, the tangential direction, and the direction perpendicular to the plane of the recording surface, of the optical information recording mediums 101 and 104 when the optical pickup device 100 is in use. It should be noted here that in the following description, the X, Y and Z axes refer to these directions, respectively.

(2) Diffraction Grating

Figure 3:
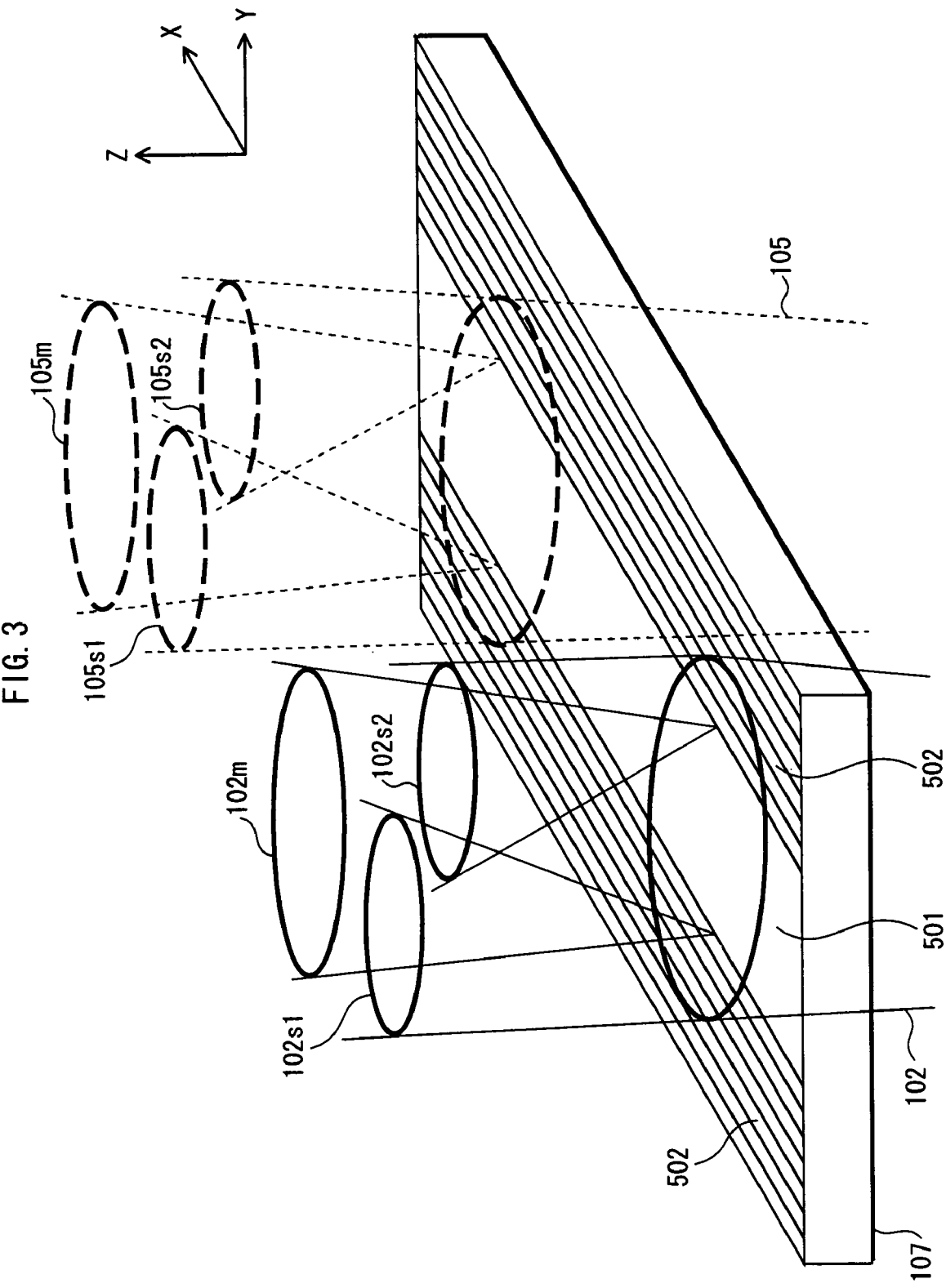
FIG. 3 is a perspective view of a diffraction grating.

FIG. 3 is an outer perspective view showing the structure of the diffraction grating 107. The diffraction grating 107 is a rectangular plate made of a translucent material, and is divided into a central portion 501 and outer portions 502 by two substantially parallel lines. The central portion 501 and the outer portions 502 differ from each other in diffraction efficiency.

The central portion 501 diffracts the light beams 102 and 105 into 0 order diffracted lights (main beams) 102m and 105m, respectively. The outer portions 502 diffract the light beam 102 into +1$^{st}$ order diffracted light (sub beams) 102s1 and −1$^{st}$ order diffracted light (sub beam) 102s2, and diffract the light beam 105 into +1$^{st}$ order diffracted light (sub beams) 105s1 and −1$^{st}$ order diffracted light (sub beam) 105s2.

To increase the efficiency in recording and reproducing information with the optical information recording mediums, it is necessary to increase the strength of the main beams. To increase the strength of the main beams, it is most preferable that the central portion 501 diffracts the light beams into 0 order diffracted lights with the diffraction efficiency of 100%. For example, the central portion 501 maybe formed as a non-grating area without the grating. With this structure, the central portion 501 does not generate the ±1$^{st}$ order diffracted lights, and the strength of the 0 order diffracted lights is maximized.

In the outer portions 502, gratings have been formed to have such depths that enable the diffraction efficiency in diffracting the light beams 102 and 105 into the ±1$^{st}$ order diffracted lights 102s1, 102s2, 105s1 and 105s2 to be maximized. With this structure, it is possible to maximize the strength of the ±1$^{st}$ order diffracted lights generated by the outer portions 502.

With such maximized strengths of the 0 order diffracted lights and ±1$^{st}$ order diffracted lights, the light use efficiency of the optical pickup device 100 is increased to the maximum.

It should be noted here that the grating of the outer portions 502 may be tilted by a predetermined degree of angle with respect to the central portion 501.

(1) Hologram Element

Figure 4:
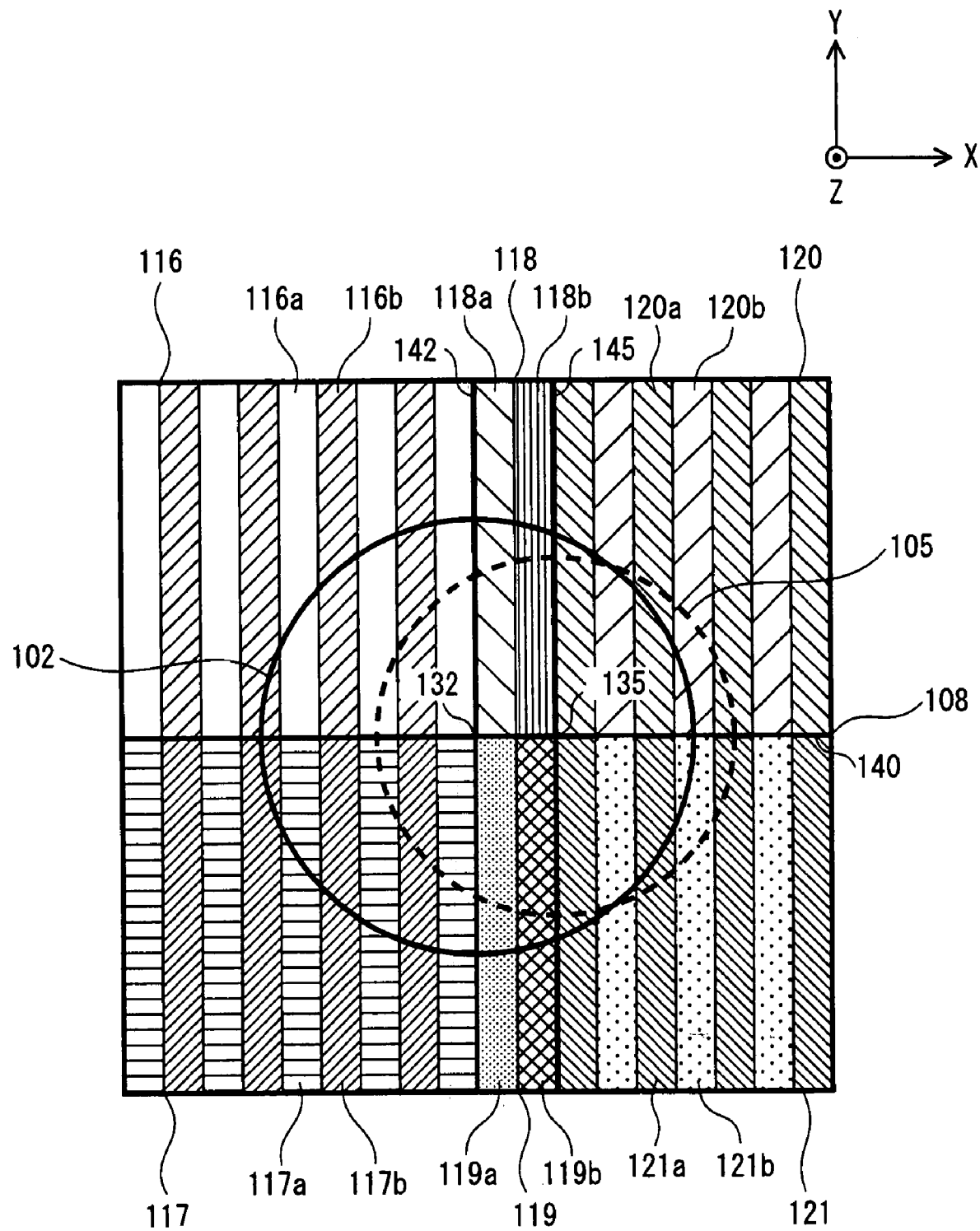
FIG. 4 is a plan view of a hologram element.

FIG. 4 is a plan view showing the structure of the hologram element 108. In the standard state of the tracking, namely, in the state where there is no tracking error, the light beam 102 reflected on the optical information recording medium enters the area (encircled by a solid line in the drawing) where a point 132 on the hologram element 108 is the strength center, and the light beam 105 reflected on the optical information recording medium enters the area (encircled by a broken line in the drawing) where a point 135 is the strength center,.

The hologram element 108 is divided into six areas 116-121 by a straight line 140 connecting the points 132 and 135, and by two straight lines 142 and 145 perpendicular to the straight line 140. The areas 116-121 diffract the incident light into different directions, respectively.

With such a structure, the light beam 102 is divided equally into four areas by the straight lines 140 and 142, and the light beam 105 is divided equally into four areas by the straight lines 140 and 145.

That is to say, the light beam 102 is divided equally into an area 116, an area 117, an area being a combination of areas 118 and 120, and an area being a combination of areas 119 and 121. Also, the light beam 105 is divided equally into an area 120, an area 121, an area being a combination of areas 116 and 118, and an area being a combination of areas 117 and 119.

Each of the areas 116-121 is divided into positive areas and negative areas that are both rectangular and alternately arranged, by straight lines being parallel to straight lines 142 and 145. In the positive and negative areas, gratings are provided such that the areas project images, which are symmetrical with respect to a point, onto a same position. The areas 116-121 are divided into positive areas 116a-121a and negative areas 116b-121b, respectively.

The optical members may be arranged in such a way that the main light beam of the light beam 102 emitted from the semiconductor laser 103 matches the optical axis of the collimator lens 114. The widths of the areas 18 and 119 of the hologram element 108 in the X axis direction are determined based on the distance between the objective lens 115 and the collimator lens 114.

(2) Beam Spots on Integrated Circuit Substrate 113

Figure 5:
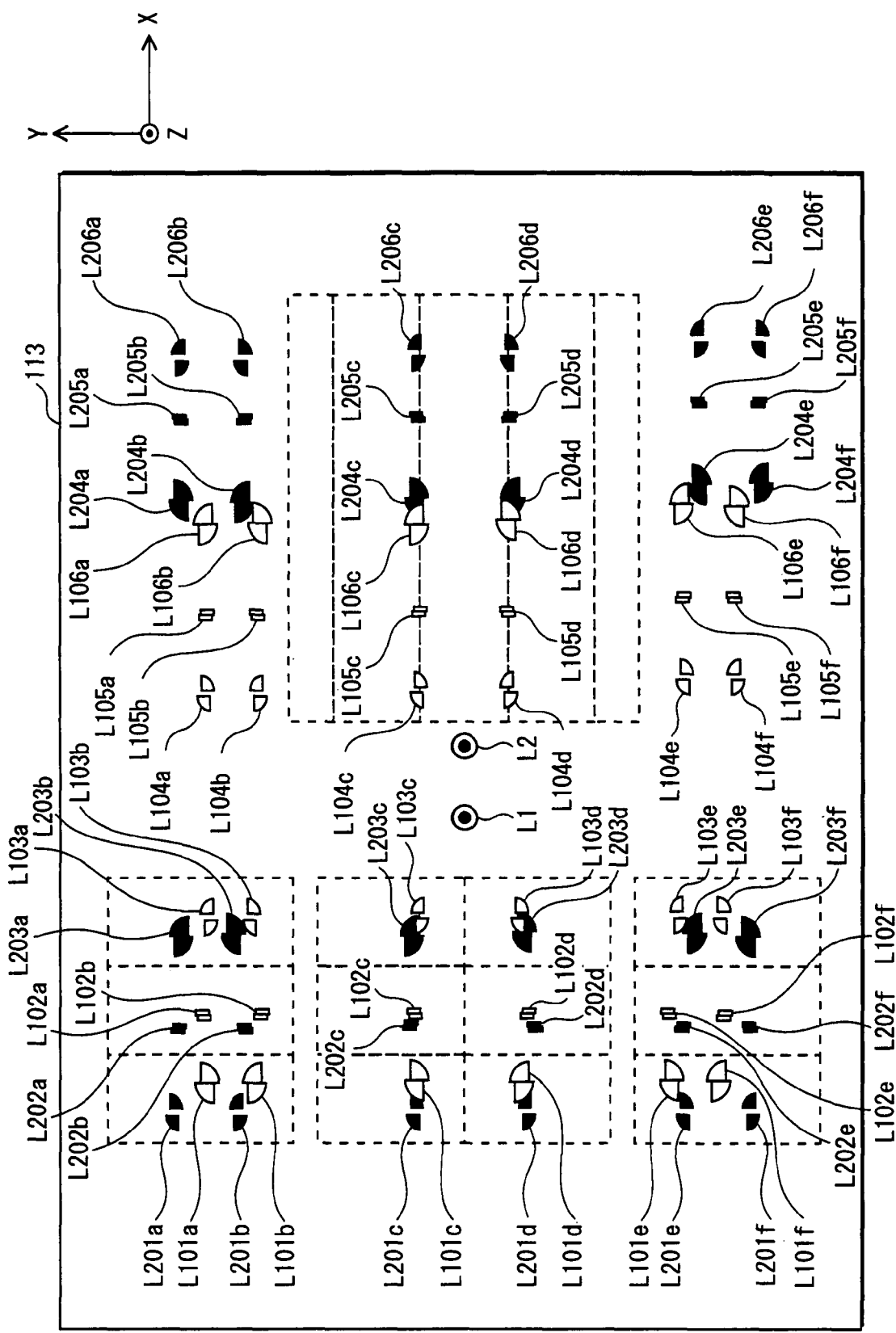
FIG. 5 is a plan view showing positions of beam spots formed on the integrated circuit substrate.

FIG. 5 is a plan view showing beam spots formed on the integrated circuit substrate 113 by the light beams 102 and 105. In FIG. 5, the outline signs indicate the beam spots formed by the light beams 102, and the black signs indicate the beam spots formed by the light beams 105. Also, rectangular areas encircled by the broken lines indicate the positions of the light receiving element groups 109-112.

The dot L1 and L2 indicate the light emission points of the semiconductor lasers 103 and 106, respectively. In the case where a reflection mirror is provided on the integrated circuit substrate 113 to guide the light to the optical information recording mediums as shown in FIG. 1, the dots L1 and L2 indicate the reflection points on the reflection mirror.

(a) Beam Spots Formed by Light Beam 102

The beam spots formed by the light beam 102 on the integrated circuit substrate 113 will be described.

FIG. 6A is a table indicating the spots that are formed by the ±1$^{st}$ order diffracted lights output from the areas 116-121 of the hologram element 108 after diffraction of the 0 order diffracted light 102m, which is output from the diffraction grating 107 after diffraction of the light beam 102. FIG. 6B is a table indicating the spots that are formed by the ±1$^{st}$ order diffracted lights output from the areas 116-121 of the hologram element 108 after diffraction of the ±1$^{st}$ order diffracted lights 102s1 and 102s2, which are output from the diffraction grating 107 after diffraction of the light beam 102.

In FIG. 5, the beam spots L101c, L106d, L101d, L106c, L102c, L105d, L102d, L105c, L103c, L104d, L103d, and L104c are formed by the ±1$^{st}$ order diffracted lights output from the areas 116-121 of the hologram element 108 after diffraction of the 0 order diffracted light 102m, which is output from the diffraction grating 107 after diffraction of the light beam 102 (FIG. 6A).

Also, the beam spots L101a, L101e, L106b, L106f, L101b, L101f, L106a, L106e, L102a, L102e, L105b, L105f, L102b, L102f, L105a, L105e, L103a, L103e, L104b, L104f, L103b, L103f, L104a, and L104e are formed by the ±1$^{st}$ order diffracted lights output from the areas 116-121 of the hologram element 108 after diffraction of the ±1$^{st}$ order diffracted lights 102s1 and 102s2, which are output from the diffraction grating 107 after diffraction of the light beam 102 (FIG. 6B).

(b) Beam Spots Formed by Light Beam 105

The beam spots formed by the light beam 105 on the integrated circuit substrate 113 will be described.

FIG. 7A is a table indicating the spots that are formed by the ±1$^{st}$ order diffracted lights output from the areas 116-121 of the hologram element 108 after diffraction of the 0 order diffracted light 105m, which is output from the diffraction grating 107 after diffraction of the light beam 105. FIG. 7B is a table indicating the spots that are formed by the ±1$^{st}$ order diffracted lights output from the areas 116-121 of the hologram element 108 after diffraction of the ±1$^{st}$ order diffracted lights 105s1 and 105s2, which are output from the diffraction grating 107 after diffraction of the light beam 105.

In FIG. 5, the beam spots L201c, L206d, L201d, L206c, L202c, L205d, L202d, L205c, L203c, L204d, L203d, and L204c are formed by the ±1$^{st}$ order diffracted lights output from the areas 116-121 of the hologram element 108 after diffraction of the 0 order diffracted light 105m, which is output from the diffraction grating 107 after diffraction of the light beam 105 (FIG. 7A).

Also, the beam spots L201a, L201e, L206b, L206f, L201b, L201f, L206a, L206e, L202a, L202e, L205b, L205f, L202b, L202f, L205a, L205e, L203a, L203e, L204b, L204f, L203b, L203f, L204a, and L204e are formed by the $\pm 1^{st}$ order diffracted lights output from the areas 116-121 of the hologram element 108 after diffraction of the $\pm 1^{st}$ order diffracted lights 105s1 and 105s2, which are output from the diffraction grating 107 after diffraction of the light beam 102 (FIG. 7B).

In this way, diffracted lights output from the same area of the hologram element 108 enter the integrated circuit substrate 113 at adjacent positions and form beam spots on the same light receiving element, regardless of whether the diffracted lights belong to the light beam 102 or 105.

(3) Light Receiving Elements

The light receiving elements provided in the optical pickup device 100 will be described.

Figure 8:
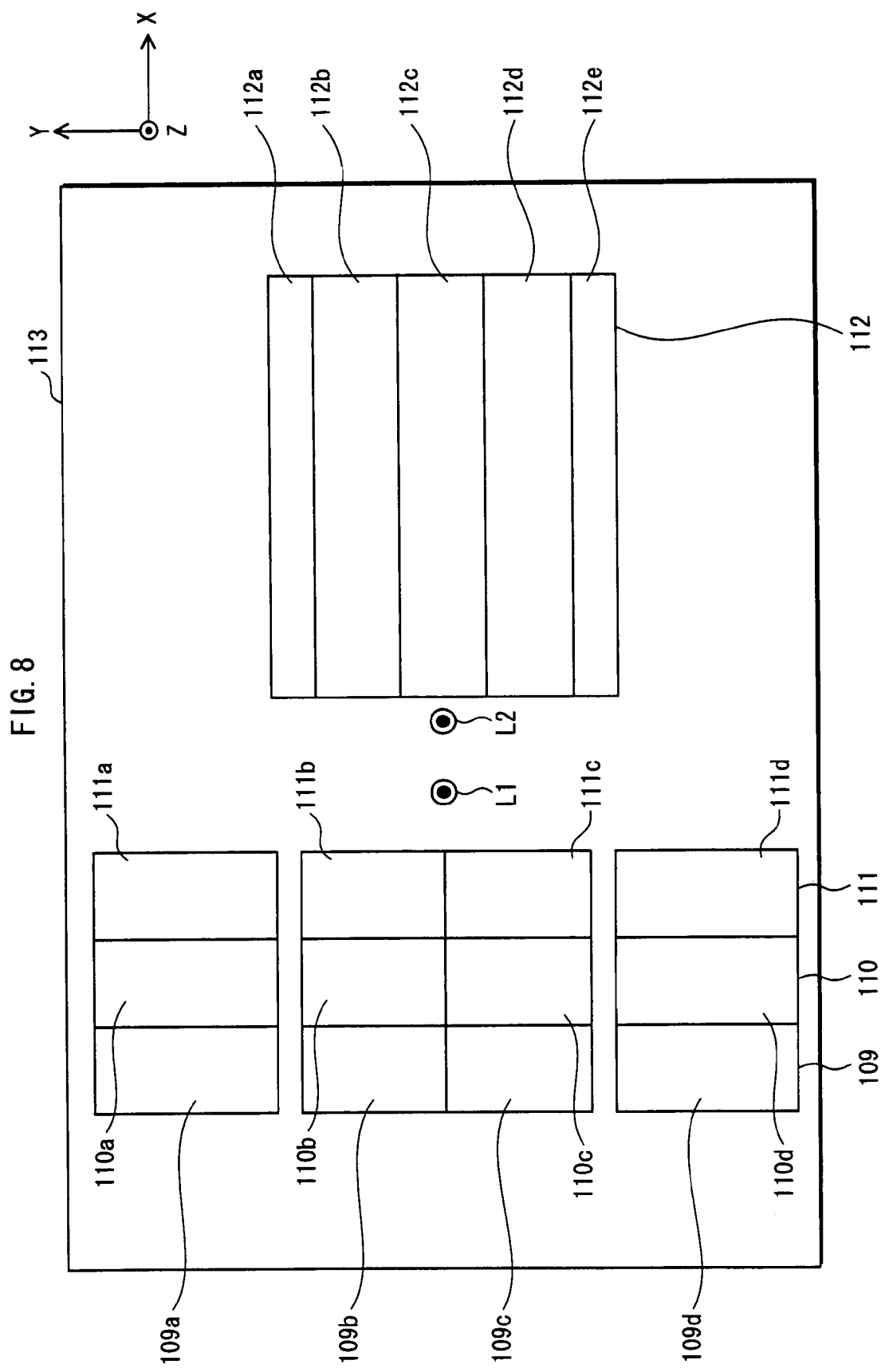
FIG. 8 is a plan view showing an arrangement of the light receiving element groups on the integrated circuit substrate.

FIG. 8 is a plan view showing an arrangement of the light receiving element groups 109-112 on the integrated circuit substrate 113. The arrangement of the light receiving element groups 109-112 shown in FIG. 8 matches the arrangement of the light receiving element groups 109-112 indicated by the broken line in FIG. 5.

As shown in FIG. 8, each of the light receiving element groups 109-112 is composed of a plurality of light receiving elements that align straight in the Y axis direction. Each of the light receiving element groups 109-111 is composed of four light receiving elements 109a-109d, 110a-110d, and 111a-111d, respectively. The light receiving element group 112 is composed of five light receiving elements 112a-112e.

The light receiving element groups 109-111 are used for detecting a tracking error signal. The light receiving element group 112 is used for detecting a focus error signal.

(4) Output Circuit

The output circuit provided on the integrated circuit substrate 113 will be described.

Figure 9:
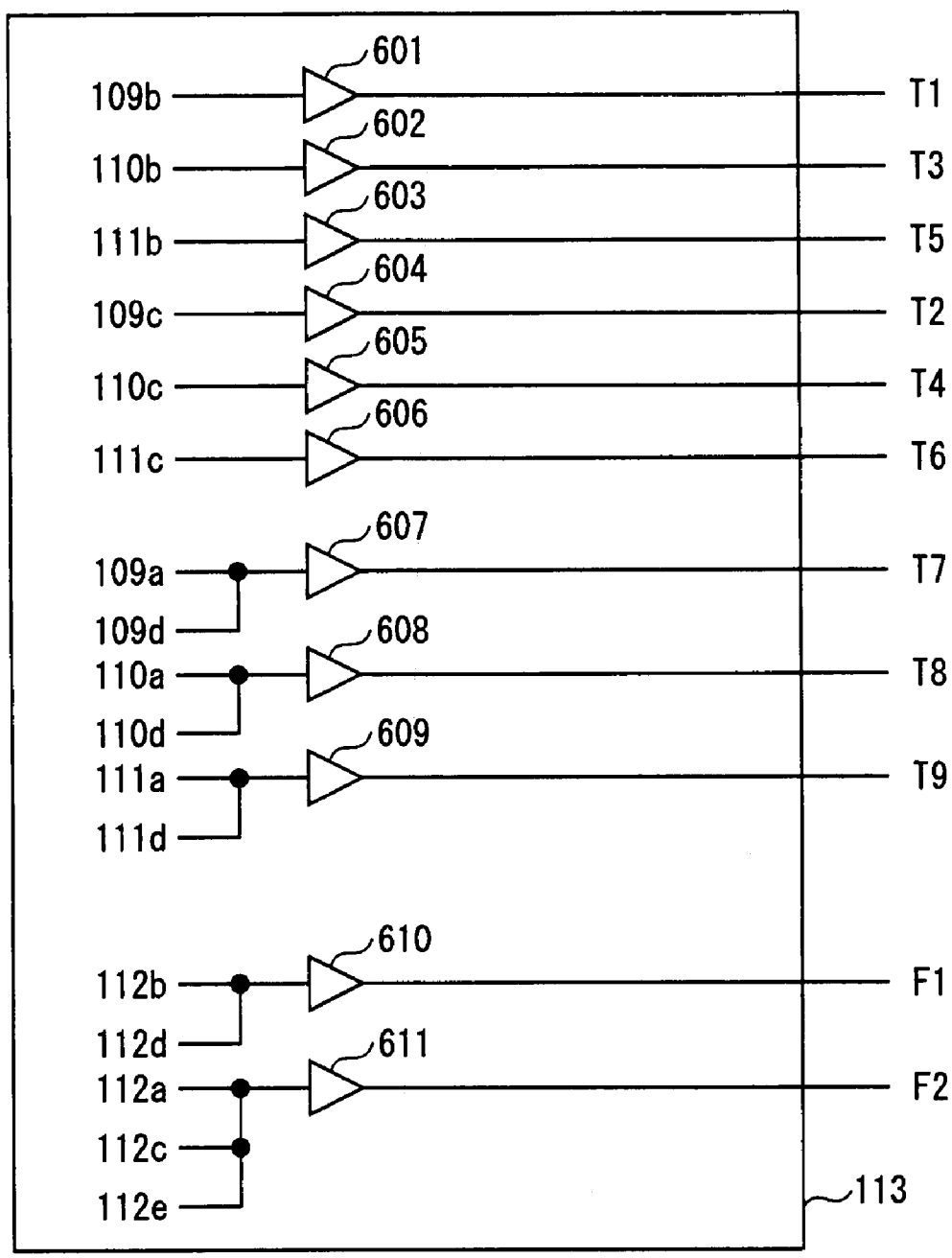
FIG. 9 is a circuit diagram showing an equivalent circuit of the output circuit.

FIG. 9 is a circuit diagram showing an equivalent circuit of the output circuit. As shown in FIG. 9, the output circuit includes 11 pieces of current/voltage amplification conversion circuits (hereinafter merely referred to as "amplification circuits") 601-611.

The amplification circuits 601-606 convert and amplify the current signals output from the light receiving elements 109b, 110b, 111b, 109c, 110c, and 111c, and output signals T1, T3, T5, T2, T4, and T6, respectively.

The amplification circuits 607-610 convert and amplify the sum of light receiving elements 109a and 109d, the sum of light receiving elements 110a and 110d, the sum of light receiving elements 111a and 111d, and the sum of light receiving elements 111b and 111d, and output signals T7-T9 and F1, respectively.

The amplification circuit 611 converts and amplifies the sum of light receiving elements 111a, 111c and 111e, and outputs signal F2.

In this way, it is possible to reduce the adverse effect of the noise by converting current signals, which are output from the light receiving elements, to voltage signals. This improves the recording/reproduction speed.

(5) Detection of Focus and Tracking Error Signals

A method of detecting the focus error signal and the tracking error signal will be described.

(a) Detection of Focus Error Signals

The optical pickup device 100 detects focus error signals FE from the signals F1 and F2 by the spot size detection method, with respect to each of the light beams 102 and 105. That is to say, $$FE1 = F1 - F2 \quad \text{(Equation 1)}.$$

(b) Detection of Tracking Error Signals by Phase Difference Detection Method

The optical pickup device 100 detects tracking error signals TE(DVD) and TE(CD) with respect to the light beams 102 and 105, by the phase difference detection method. That is to say, $$TE(DVD) = \text{(phase difference between } T1 \text{ and}(T3+T5)) + \text{(phase difference between } T2 \text{ and}(T4+T6), \quad \text{(Equation 2)}$$

$$TE(CD) = \text{(phase difference between}(T1+T3) \text{ and } T5) + \text{(phase difference between}(T2+T4)+T6). \quad \text{(Equation 3)}$$

(c) Detection of Tracking Error Signals by Differential Push-Pull Method

The optical pickup device 100 detects tracking error signals TE(DVD) and TE(CD) with respect to the light beams 102 and 105, by the differential push-pull method. That is to say, $$TE(DVD) = (T1+T2)-(T3+T4+T5+T6)-k[T7-(T8+T9)], \quad \text{(Equation 4)}$$

$$TE(CD) = (T1+T2+T3+T4)-(T5+T6)-k[(T7+T8)-T9]. \quad \text{(Equation 5)}$$

Here, "k" is a constant with which each of the tracking error signals TE (DVD) and TE (CD) represents 0 when there is no tracking error.

It is understood from Equations 2 through 6 that it is possible to detect tracking error signals for DVD by adding signals T3, T4 and T8 to signals T5, T6 and T9, respectively, regardless of whether the phase difference detection method or the differential push-pull method is used. Also, it is possible to detect tracking error signals for CD by adding signals T3, T4 and T8 to signals T1, T2 and T7, respectively, regardless of whether the phase difference detection method or the differential push-pull method is used.

(6) Modification of Output Circuit

Next, a modification of the output circuit in the present embodiment will be described.

Figure 10:
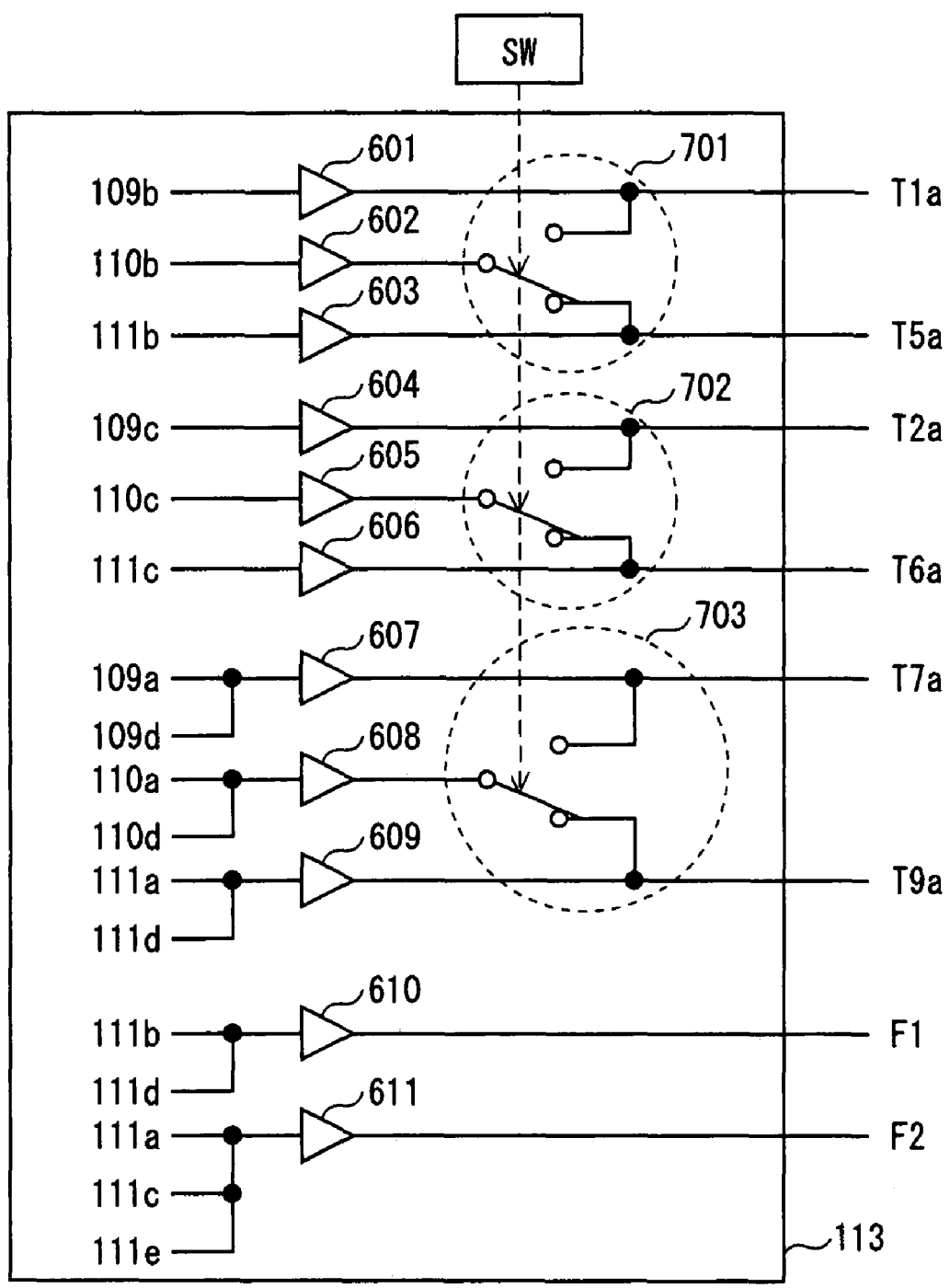
FIG. 10 is a circuit diagram showing an equivalent circuit of the output circuit in a modification.

FIG. 10 is a circuit diagram showing an equivalent circuit of the output circuit in the present modification. As shown in FIG. 10, the output circuit of the modification differs from the output circuit of the embodiment shown in FIG. 9 in that it additionally includes switch circuits 701-703.

The switch circuit 701 makes a connection such that an output from an amplification circuit 602 (corresponding to T3 in FIG. 9) is added to an output from an amplification circuit 603 (corresponding to T5), when a recording or reproduction is performed with DVD. Also, the switch circuit 701 makes a connection such that an output from the amplification circuit 602 is added to an output from an amplification circuit 601 (corresponding to T1), when a recording or reproduction is performed with CD. That is to say, a signal representing a sum of T5 and T3 is output as T5a.

The switch circuit 702 makes a connection such that an output from an amplification circuit 605 (corresponding to T4) is added to an output from an amplification circuit 606 (corresponding to T6), when a recording or reproduction is performed with DVD. That is to say, a signal representing a sum of T4 and T6 is output as T6a. Also, the switch circuit 702 makes a connection such that an output from the amplification circuit 605 is added to an output from an amplification circuit 604 (corresponding to T2), when a recording or reproduction is performed with CD. That is to say, a signal representing a sum of T2 and T4 is output as T2a.

The switch circuit 703 makes a connection such that an output from an amplification circuit 608 (corresponding to T8) is added to an output from an amplification circuit 609 (corresponding to T9), when a recording or reproduction is performed with DVD. That is to say, a signal representing a sum of T8 and T9 is output as T9a. Also, the switch circuit 703 makes a connection such that an output from the amplification circuit 608 is added to an output from an amplification circuit 607 (corresponding to T7), when a recording or reproduction is performed with CD. That is to say, a signal representing a sum of T7 and T8 is output as T7a.

With use of the switch circuits 701-703 that function as described above, it is possible to obtain a tracking error signal TE(DPD) by the phase difference detection method, for both DVD and CD, from the following equation.

$$TE(DPD) = \text{(phase difference between } T1a \text{ and } T5a) + \text{(phase difference between } T2a \text{ and } T6a). \quad \text{(Equation 9)}$$

Also, it is possible to obtain a tracking error signal TE(DPP) by the differential push-pull method, for both DVD and CD, from the following equation.

$$TE(DPP) = (T1a + T2a) - (T5a + T6a) - k(T7a + T9a). \quad \text{(Equation 10)}$$

Here, "k" is a constant with which TE(DPP) is 0 when the tracking is in the normal state.

With the above-stated structure, the output circuit of the modification outputs a smaller number of signals than the output circuit shown in FIG. 9, and an external circuit for the addition calculation is not required.

(7) Conclusion

As described above, according to the present embodiment, it is possible to detect a focus/tracking error signal for achieving the recording and reproduction in a stable manner, for both the two types of optical information recording mediums, DVD and CD.

Also, it is possible to completely separate the signal circuit for detecting a focus error signal and the signal circuit for detecting a tracking error signal, and DVD and CD can share the signal circuits for detecting focus and tracking error signals. This makes it possible to simplify the signal processing circuit.

Embodiment 2

Embodiment 2 of the present invention will be described. The optical pickup device in Embodiment 2 has almost the same structure as the optical pickup device in Embodiment 1, except for the structure of the light receiving element. The following description will center of the differences.

(1) Entire Structure

FIGS. 11A and 11B schematically show the entire structure of the optical pickup device in Embodiment 2.

FIG. 11A shows light paths of light beams 202 and 205 from semiconductor lasers 203 and 206 to optical information recording mediums 201 and 204, respectively. FIG. 11B shows light paths of light beams 202 and 205 from optical information recording mediums 201 and 204 to light receiving element groups 209-215, respectively. The X, Y and Z axes are the same as those shown in FIGS. 2A and 2B.

As shown in FIGS. 11A and 11B, an optical pickup device 200 includes semiconductor lasers 203 and 206, a diffraction grating 207, a hologram element 208, light receiving element groups 209-215, an integrated circuit substrate 216, a collimator lens 217, and an objective lens 218.

The semiconductor lasers 203 and 206 emit light beams 202 and 205 having wavelengths conforming to the standards of the optical information recording mediums 201 and 204, respectively. It should be noted here that the wavelength of the light beam 202 is shorter than that of the light beam 205.

The optical pickup device 200 also includes an optical information recording medium identifying unit that identifies the type of the optical information recording medium that is an object of recording/reproduction. The optical pickup device 200 determines which of the semiconductor lasers 203 and 206 to drive, based on the type of the optical information recording medium identified by the optical information recording medium identifying unit.

The diffraction grating 207 diffracts the light beams 202 and 205 into 0 order diffracted light (main beam), $+1^{st}$ order diffracted light (sub beam, not illustrated) and $-1^{st}$ order diffracted light (sub beam, not illustrated), on the light paths from the semiconductor lasers 203 and 206 to the hologram element 208, respectively. The structure of the diffraction grating 207 is the same as the structure of the diffraction grating 107 in Embodiment 1 (see FIG. 3).

The hologram element 208 diffracts the light beams 202 and 205 that were reflected on the optical information recording mediums 201 and 204, respectively. The light receiving element groups 209-215 receive diffracted light that comes after diffraction by the hologram element 208, and performs a photoelectric conversion on the received diffracted light. The signals, which are generated by the photoelectric conversion performed by the light receiving element groups 209-215, are output via an output circuit that is not illustrated.

The semiconductor lasers 203 and 206, light receiving element groups 209-215, and output circuit are loaded on the integrated circuit substrate 216.

A collimator lens 217 and an objective lens 218 are provided on the light paths from the hologram element 208 to the optical information recording mediums 201 and 204. It is preferable that the optical members are arranged in such a way that the main light beam of the light beam 202 emitted from the semiconductor laser 203 matches the center of the optical axis of the collimator lens 217.

(3) Structure of Hologram Element 208

Figure 12:
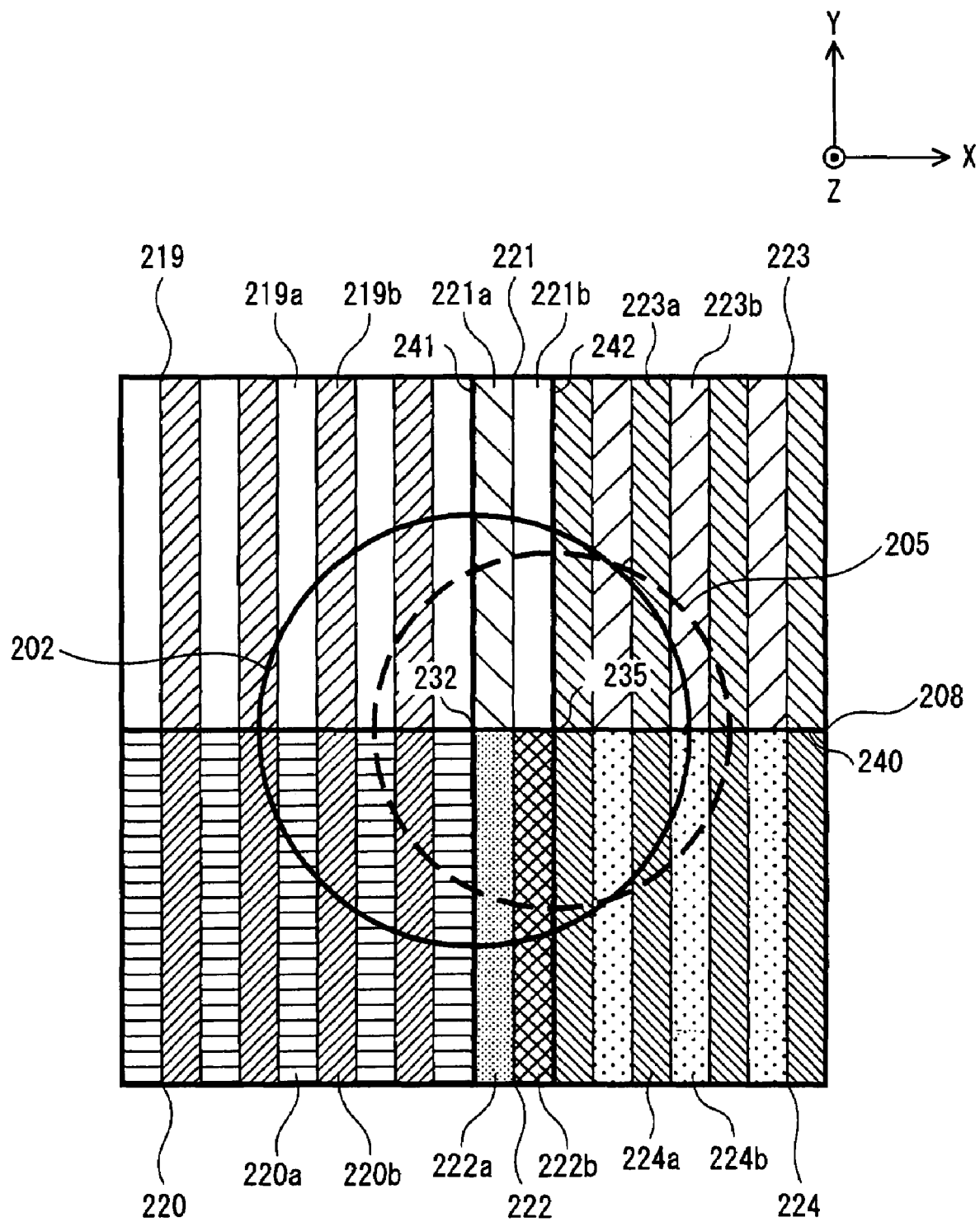
FIG. 12 is a plan view of a hologram element.

Next, the structure of the hologram element 208 will be described. FIG. 12 is a plan view showing the structure of the hologram element 208.

In FIG. 12, points 232 and 235 represent strength centers of the light beam 202 and 205 reflected on the optical information recording mediums 201 and 204, respectively, in the standard state of the tracking, namely, for example, in the state where there is no tracking error.

The main surface of the hologram element 208 is divided into six areas 219-224 by a straight line 208 connecting the points 232 and 235, and by two straight lines 241 and 242 that are perpendicular to the straight line 208 at the points 232 and 235. The areas 219-224 diffract the light beams 202 and 205 into different directions, respectively.

In the above-described structure where the main surface of the hologram element 208 is divided into the six areas, four areas, which are area 219, area 220, a combination of areas 221 and 223, and a combination of areas 222 and 224, receive an equivalent amount of light from a reflected light of the light beam 202 after reflection on the optical information recording medium 201 in the standard state of the tracking.

Similarly, the four areas, which are area 219, area 220, a combination of areas 221 and 223, and a combination of areas 222 and 224, receive an equivalent amount of light from a reflected light of the light beam 205 after reflection on the optical information recording medium 204.

Each of the areas 219-224 is divided into positive areas and negative areas that are both rectangular and alternately arranged. Namely, the areas 219-224 are divided into positive areas 219a-224a and negative areas 219b-224b, respectively. In the positive and negative areas, gratings are provided such that images that are symmetrical with respect to a point are focused onto a same light receiving element.

The light paths of the light beams 202 and 205 change depending on the distance between the collimator lens 217 and the objective lens 218, and the positions of the points 232 and 235 change depending on the positional relationship among the collimator lens 217, the objective lens 218, and the hologram element 208. Accordingly, how the main surface of the hologram element 208 is divided into areas is determined based on these positional relationships.

(3) Beam Spots on Integrated Circuit Substrate 216

Figure 13:
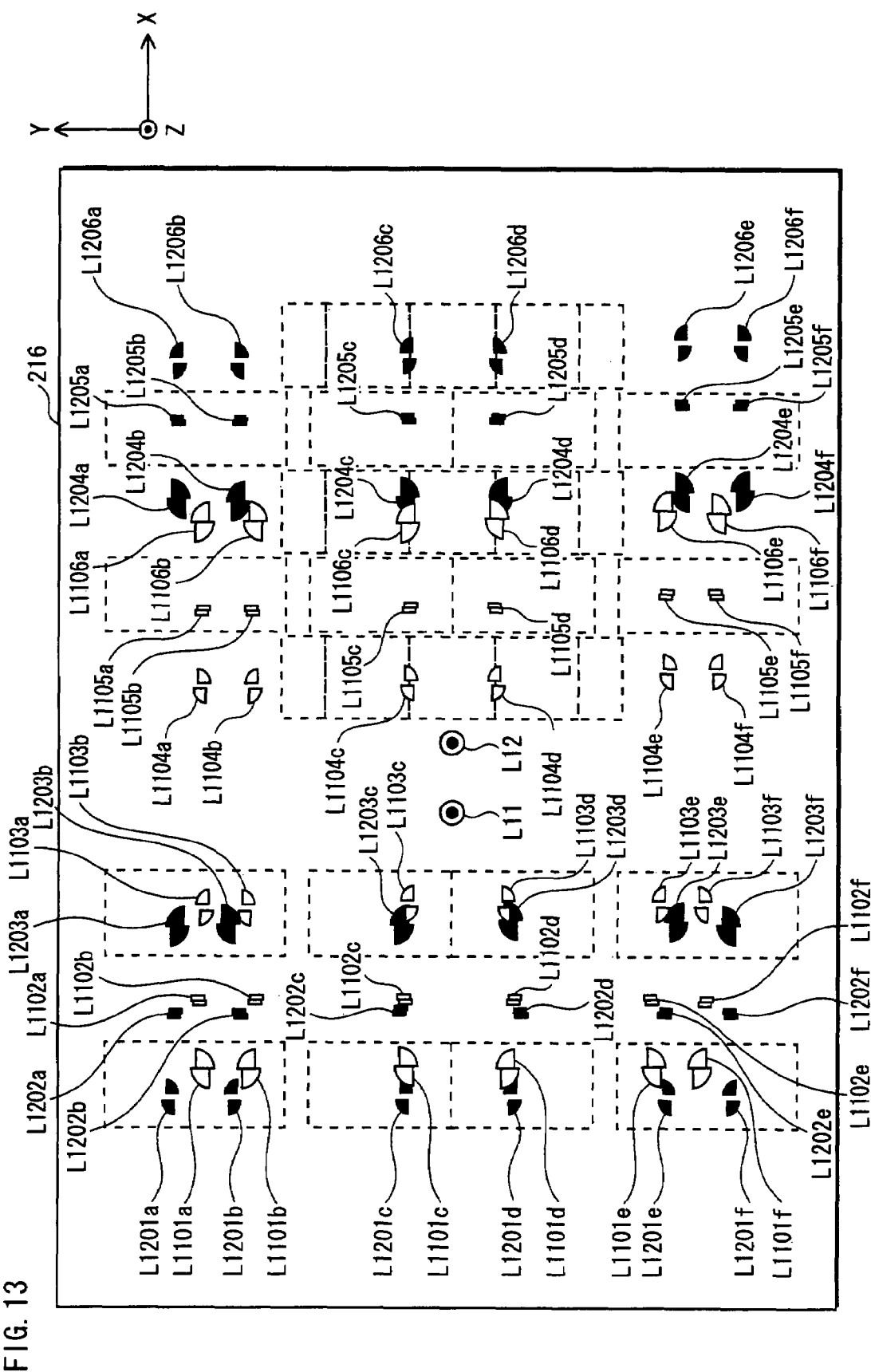
FIG. 13 is a plan view showing positions of beam spots formed on the integrated circuit substrate.

FIG. 13 is a plan view showing beam spots (hereinafter merely referred to as spots) formed on the integrated circuit substrate 216 by the light beams 202 and 205. In FIG. 13, the outline signs indicate the spots formed by the light beams 202, and the black signs indicate the spots formed by the light beams 205. Also, rectangular areas encircled by the broken lines indicate the positions of the light receiving element groups 209-215.

The dots L1 and L2 indicate the light emission points of the semiconductor lasers 203 and 206, respectively. In the case where a reflection mirror is provided on the integrated circuit substrate 216 to guide the light to the optical information recording mediums as shown in FIG. 1, the dots L1 and L2 indicate the reflection points on the reflection mirror.

(a) Beam Spots Formed by Light Beam 202

The beam spots formed by the light beam 202 on the integrated circuit substrate 216 will be described.

FIG. 14A is a table indicating the spots that are formed by the $\pm 1^{st}$ order diffracted lights output from the areas 219-224 of the hologram element 208 after diffraction of the 0 order diffracted light 202m, which is output from the diffraction grating 207 after diffraction of the light beam 202. FIG. 14B is a table indicating the spots that are formed by the $\pm 1^{st}$ order diffracted lights output from the areas 219-224 of the hologram element 208 after diffraction of the $\pm 1^{st}$ order diffracted lights 202s1 and 202s2, which are output from the diffraction grating 207 after diffraction of the light beam 202.

In FIG. 13, the beam spots L1101c, L1106d, L1101d, L1106c, L1102c, L1105d, L1102d, L1105c, L1103c, L1104d, L1103d, and L1104c are formed by the $\pm 1^{st}$ order diffracted lights output from the areas 219-224 of the hologram element 208 after diffraction of the 0 order diffracted light 202m, which is output from the diffraction grating 207 after diffraction of the light beam 202 (FIG. 14A).

Also, the beam spots L1101a, L1101e, L1106b, L1106f, L1101b, L1101f, L1106a, L1106e, L1102a, L1102e, L1105b, L1105f, L1102b, L1102f, L1105a, L1105e, L1103a, L1103e, L1104b, L1104f, L1103b, L1103f, L1104a, and L1104e are formed by the $\pm 1^{st}$ order diffracted lights output from the areas 219-224 of the hologram element 208 after diffraction of the $\pm 1^{st}$ order diffracted lights 202s1 and 202s2, which are output from the diffraction grating 207 after diffraction of the light beam 202 (FIG. 14B).

(b) Beam Spots Formed by Light Beam 205

The beam spots formed by the light beam 205 on the integrated circuit substrate 216 will be described.

FIG. 15A is a table indicating the spots that are formed by the $\pm 1^{st}$ order diffracted lights output from the areas 219-224 of the hologram element 208 after diffraction of the 0 order diffracted light 205m, which is output from the diffraction grating 207 after diffraction of the light beam 205. FIG. 15B is a table indicating the spots that are formed by the $\pm 1^{st}$ order diffracted lights output from the areas 219-224 of the hologram element 208 after diffraction of the $\pm 1^{st}$ order diffracted lights 205s1 and 205s2, which are output from the diffraction grating 207 after diffraction of the light beam 205.

In FIG. 13, the beam spots L1201c, L1206d, L1201d, L1206c, L1202c, L1205d, L1202d, L1205c, L1203c, L1204d, L1203d, and L1204d are formed by the $\pm 1^{st}$ order diffracted lights output from the areas 219-224 of the hologram element 208 after diffraction of the 0 order diffracted light 205m, which is output from the diffraction grating 207 after diffraction of the light beam 205 (FIG. 15A).

Also, the beam spots L1201a, L1201e, L1206b, L1206f, L1201b, L1201f, L1206a, L1206e, L1202a, L1202e, L1205b, L1205f, L1202b, L1202f, L1205a, L1205e, L1203a, L1203e, L1204b, L1204f, L1203b, L1203f, L1204a, and L1204e are formed by the $\pm 1^{st}$ order diffracted lights output from the areas 219-224 of the hologram element 208 after diffraction of the $\pm 1^{st}$ order diffracted lights 205s1 and 205s2, which are output from the diffraction grating 207 after diffraction of the light beam 202 (FIG. 15B).

In this way, the areas 219, 220, 222, and 223 diffract light so that the spots of the light beams 202 and 205 enter the same light receiving element. Also, the areas 220 and 221 diffract light so that the spots of the light beams 202 and 205 enter the different light receiving elements.

(4) Light Receiving Element Groups 209-215

Next, the light receiving element groups 209-215 will be described.

Figure 16:
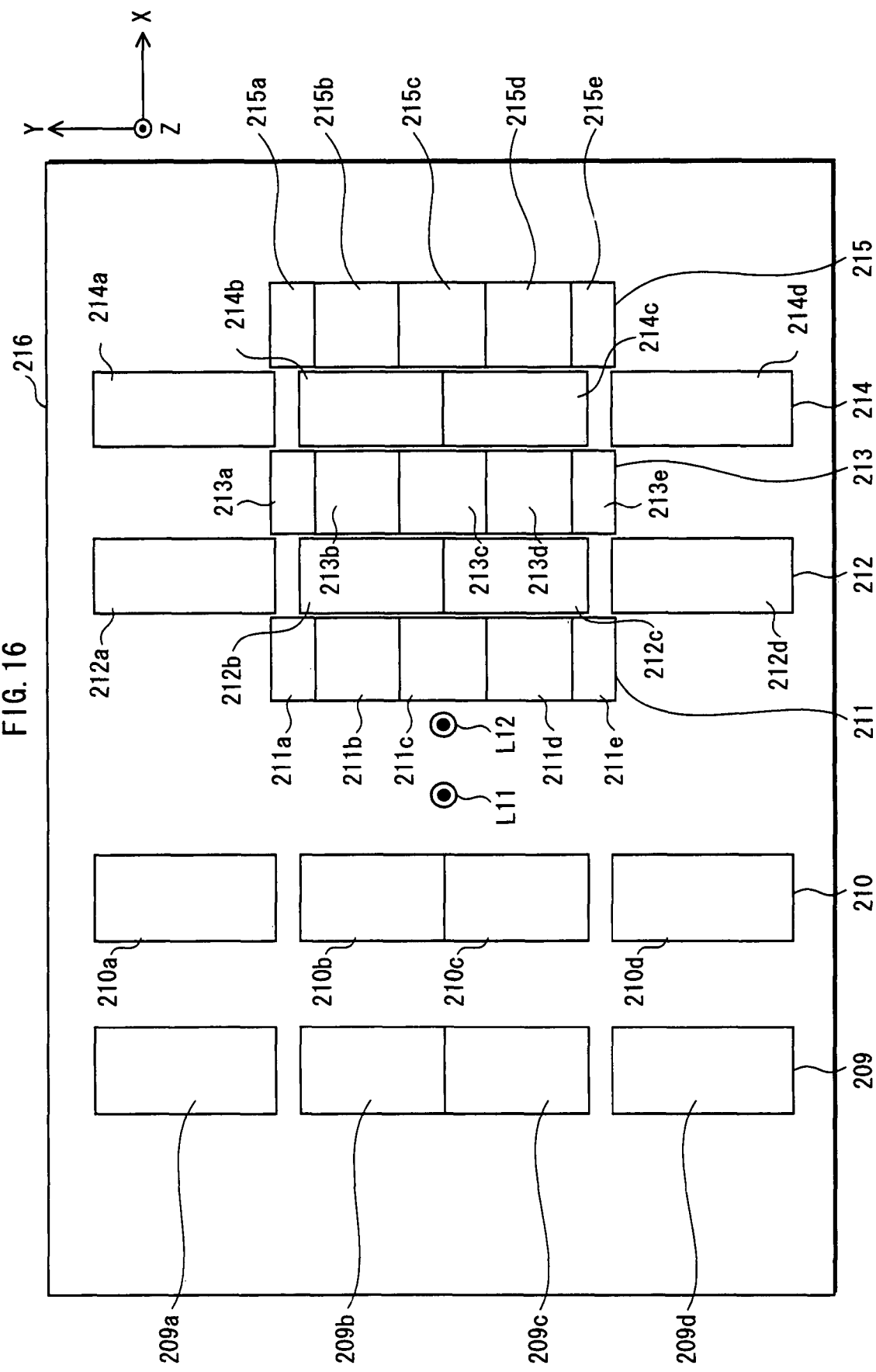
FIG. 16 is a plan view showing an arrangement of the light receiving element groups on the integrated circuit substrate.

FIG. 16 is a plan view showing an arrangement of the light receiving element groups 209-215 on the integrated circuit substrate 216.

As shown in FIG. 16, each of the light receiving element groups 209-215 is composed of a plurality of light receiving elements that align straight in the Y axis direction. Each of the light receiving element groups 209, 210, 212, and 214 is composed of four tight receiving elements 209a-209d, 210a-210d, 212a-212d, and 211a-212d, respectively. Each of the light receiving element groups 211, 213, and 215 is composed of five light receiving elements 211a-211e, 213a-213e, and 215a-215e, respectively.

The light receiving element group 212 receives a diffracted light from the areas 220. and 221 of the hologram element 208 after diffraction of the light beam 202, and outputs a signal that varies depending on the amount of the received light. The light receiving element group 214 receives a diffracted light from the areas 220 and 221 of the hologram element 208 after diffraction of the light beam 205, and outputs a signal that varies depending on the amount of the received light.

In Embodiment 1, the light receiving element group 110 receives the ±1$^{st}$ order diffracted lights output from the areas 118 and 119 of the hologram element 108 after diffraction of the 0 order diffracted light 102m, which is output from the diffraction grating 107 after diffraction of the light beam 102, and the −1$^{st}$ order diffracted lights are not used.

On the other hand, in the present embodiment, the light receiving element group 212 receives the −1$^{st}$ order diffracted lights output from the areas 211 and 212 of the hologram element 208 after diffraction of the 0 order diffracted light 202m, which is output from the diffraction grating 207 after diffraction of the light beam 202, and the +1$^{st}$ order diffracted lights are not used.

(5) Output Circuit

Figure 17:
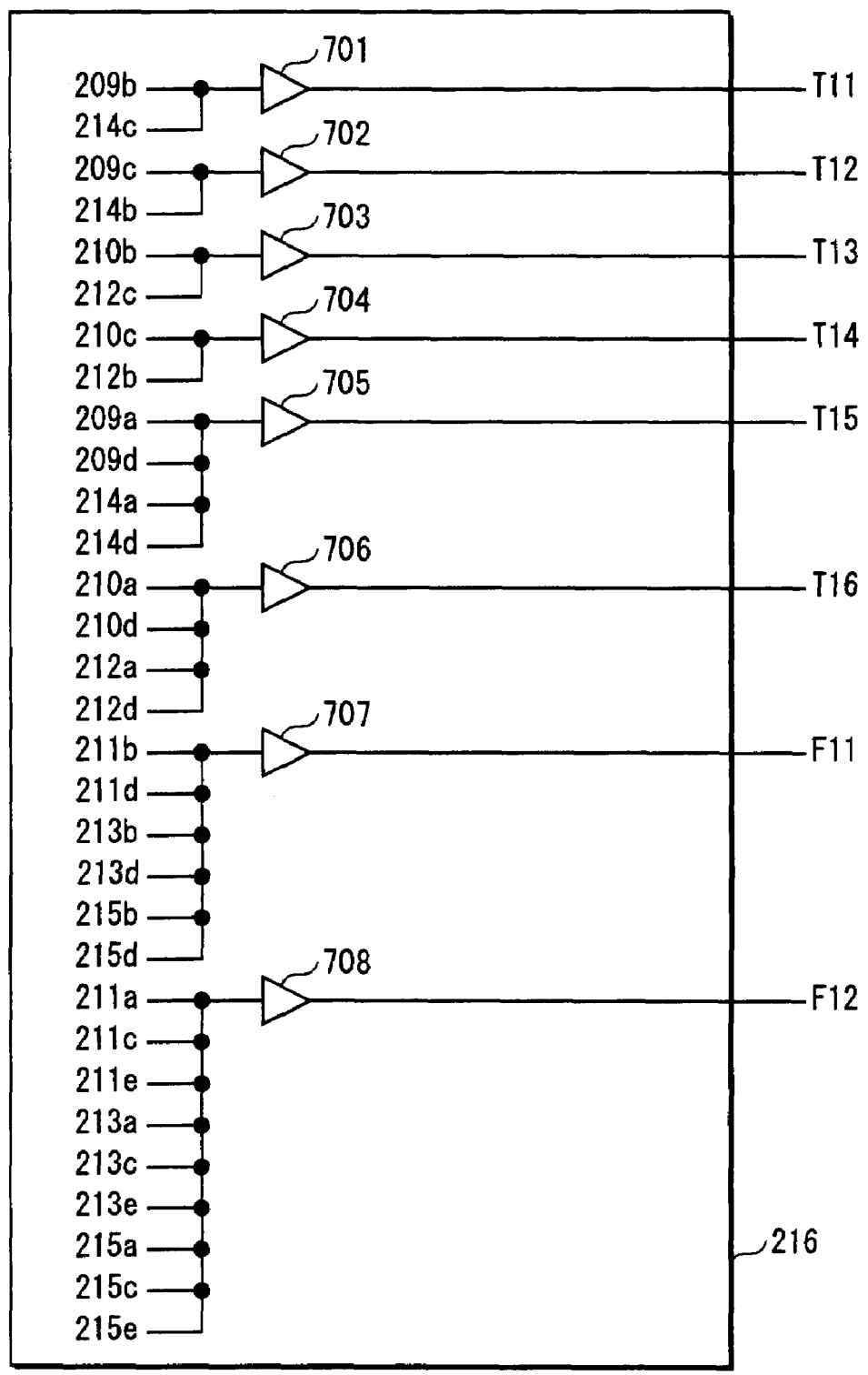
FIG. 17 is a circuit diagram showing an equivalent circuit of the output circuit.

FIG. 17 is a circuit diagram showing an equivalent circuit of the output circuit provided on the integrated circuit substrate 216.

As shown in FIG. 17, the amplification circuit 701 converts and amplifies the current signals output from the light receiving elements 209b and 214c, and outputs a signal T11. The amplification circuit 702 converts and amplifies the current signals output from the light receiving elements 209c and 214b, and outputs a signal T12. The amplification circuit 703 converts and amplifies the current signals output from the light receiving elements 210b and 212c, and outputs a signal T13. The amplification circuit 704 converts and amplifies the current signals output from the light receiving elements 210c and 212b, and outputs a signal T14.

The amplification circuit 705 converts and amplifies the current signals output from the light receiving elements 209a, 209d, 214a, and 214d, and outputs a signal T15. The amplification circuit 706 converts and amplifies the current signals output from the light receiving elements 210a, 210d, 212a, and 212d, and outputs a signal T16. The amplification circuit 707 converts and amplifies the current signals output from the light receiving elements 211a, 211d, 213b, 213d, 215b, and 215d, and outputs a signal F11.

The amplification circuit 708 converts and amplifies the current signals output from the light receiving elements 211a, 211c, 211e, 213a, 213c, 213e, 215a, 215c, and 215e, and outputs a signal F12.

The signals output from the amplification circuit 701-708 are voltage signals. Since the voltage signals have higher tolerance for noise than the current signals, this structure improves the recording/reproduction speed.

(6) Detection of Focus and Tracking Error Signals

A method of detecting the focus error signal and the tracking error signal will be described, with respect to the light beams 202 and 205.

(a) Detection of Focus Error Signals

The optical pickup device 200 detects focus error signals FE from the signals F11 and F12 by the spot size detection method, with respect to each of the light beams 202 and 205. That is to say, $$FE1 = F11 - F12 \qquad \text{(Equation 11)}.$$

(b) Detection of Tracking Error Signals by Phase Difference Detection Method

The optical pickup device 200 detects a tracking error signal TE from the signals T11-T14 by the phase difference detection method, with respect to the light beams 202 and 205. That is to say, $$TE = (\text{phase difference between } T11 \text{ and } T13) + \qquad \text{(Equation 12)}$$
$$(\text{phase difference between } T12 \text{ and } T14).$$

(c) Detection of Tracking Error Signals by Differential Push-Pull Method

The optical pickup device 200 detects tracking error signals TE from the signals T11-T16 by the differential push-pull method, with respect to each of the light beams 202 and 205. That is to say, $$TE = (T11 + T12) - (T13 + T14) - k(T15 - T16), \qquad \text{(Equation 13)}$$

Here, "k" is a constant with which the tracking error signal TE represents 0 when there is no tracking error.

(7) Conclusion

As described above, according to the present embodiment, it is possible to perform the recording and reproduction with accuracy with both the optical information recording mediums 201 and 204 which conform to different standards, since the semiconductor lasers 203 and 206 of the present embodiment emit the light beams 202 and 205 that have different wavelengths. Also, as is the case with Embodiment 1, it is possible to detect a focus/tracking error signal for in a stable manner.

Further, the structure of the present embodiment makes it possible to completely separate the signal system for detecting a focus error signal and the signal system for detecting a tracking error signal. The present embodiment differs from Embodiment 1 in that it enables the signal processing system to be simplified since it does not require a switch circuit for performing a selective addition.

[3] Modification

Up to now, embodiments of the present invention have been described. However, not limited to these embodiments, the present invention can be modified variously, for example, as follows.

(1) In the above-described embodiments, single-wavelength semiconductor lasers are provided according to different types of optical information recording mediums, respectively. However, not limited to this, monolithic 2-wavelength semiconductor lasers may be provided instead.

Figure 18:
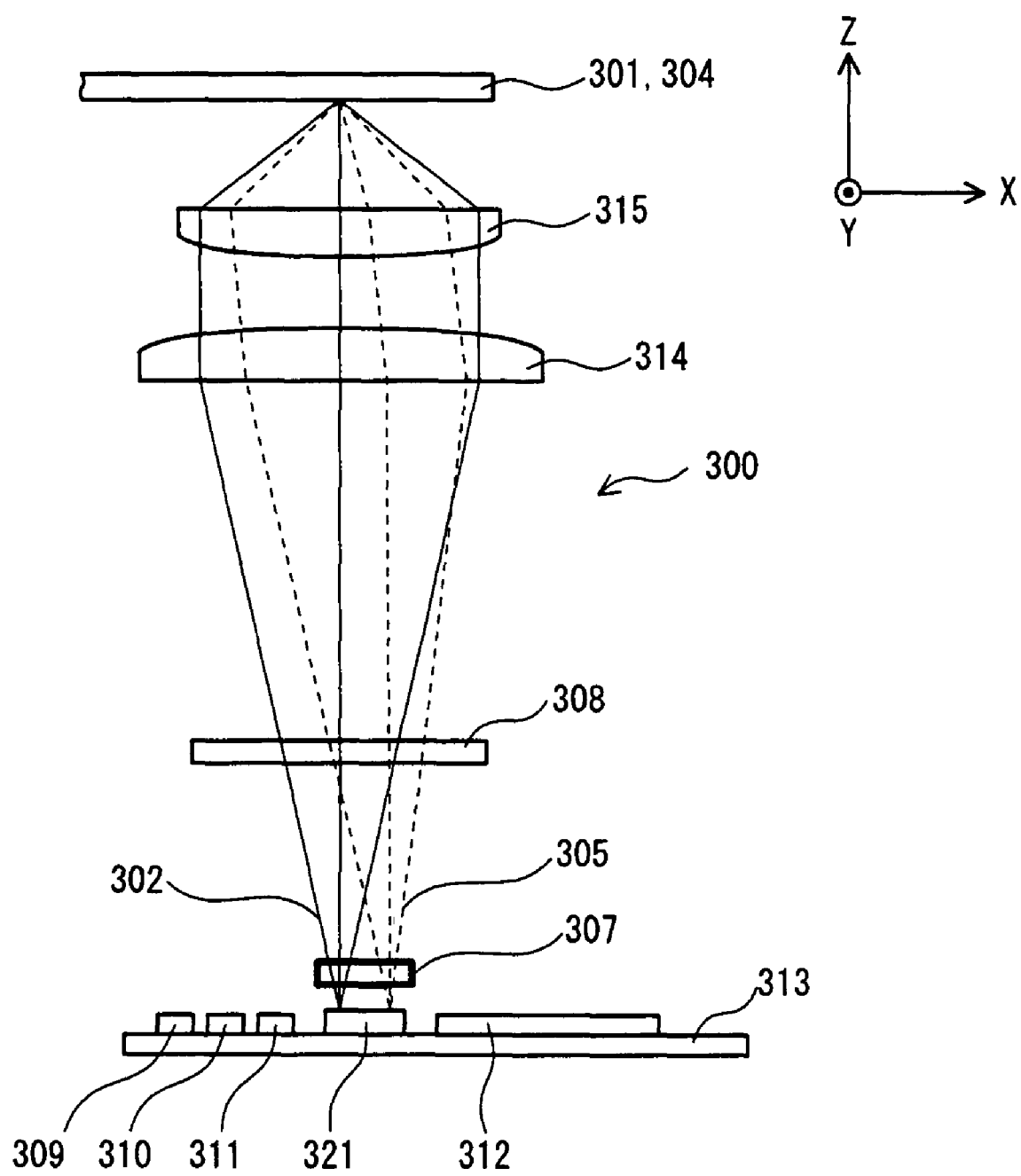
FIG. 18 is a schematic view showing an entire structure of an optical pickup device using a monolithic 2-wavelength semiconductor laser.

FIG. 18 is a cross-sectional view showing an entire structure of an optical pickup device in the present modification. As shown in FIG. 18, an optical pickup device 300 of the present modification is provided with a monolithic 2-wavelength semiconductor laser 321, instead of the semiconductor laser 104 or 106.

The accuracy of the light beam emission interval depends on the assembly accuracy in the case of the semiconductor lasers 103 and 106, and depends on the diffusion accuracy in the case of the monolithic 2-wavelength semiconductor laser 321. The present modification therefore improves the accuracy of the light beam emission interval. The same advantageous effect can also be obtained in Embodiment 2 by using the monolithic 2-wavelength semiconductor lasers instead of the semiconductor lasers 203 and 206.

It should be noted here that the advantageous effects produced by the above-described embodiments do not change if this structure of the modification is adopted.

(2) In the above-described embodiments, the semiconductor lasers and the light receiving elements are provided on the integrated circuit substrate. However, the components such as the integrated circuit substrate may be loaded in one package.

Figure 19:
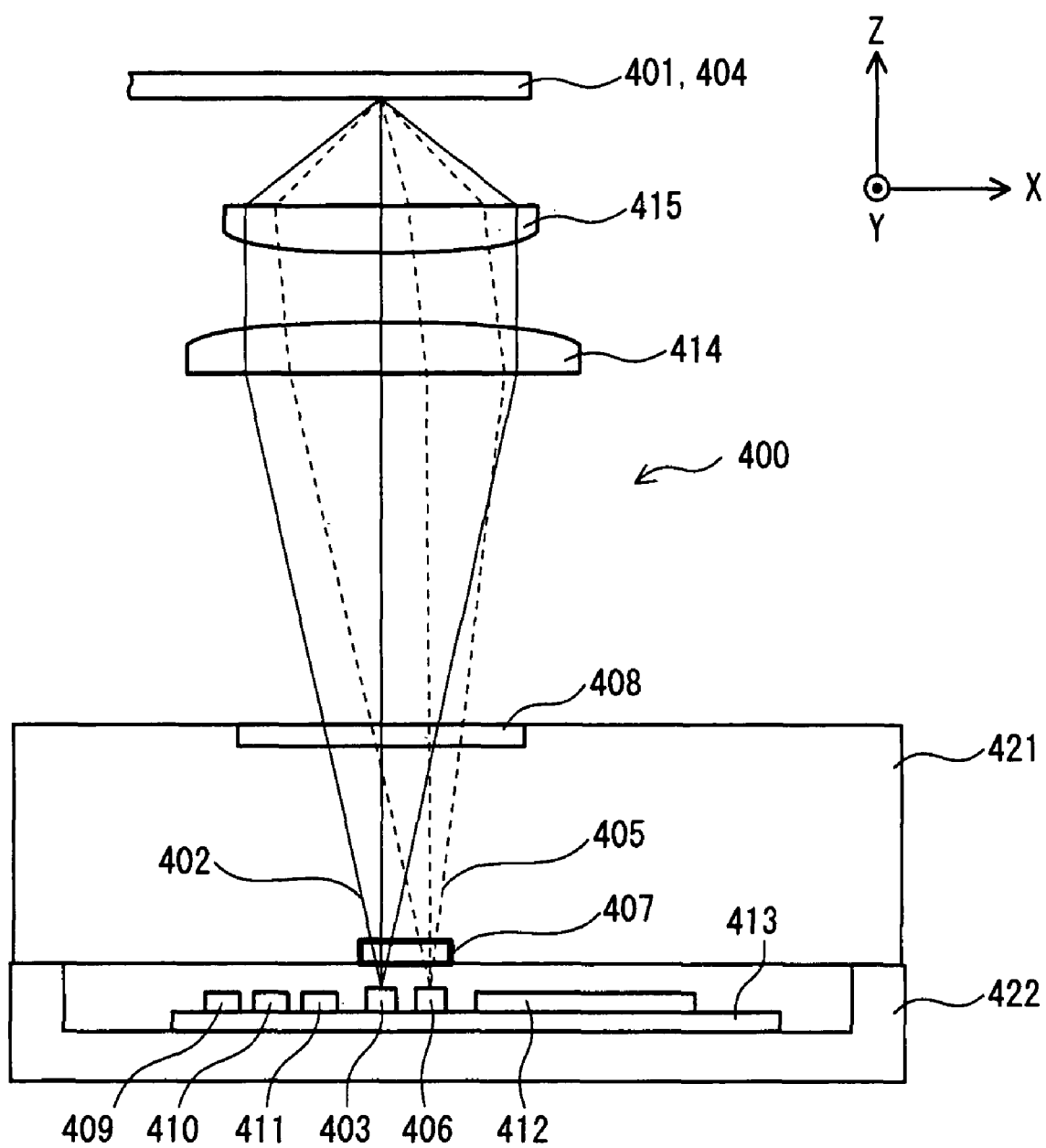
FIG. 19 is a schematic view showing an entire structure of an optical pickup device in which main optical components are loaded in one package.

FIG. 19 is a cross-sectional view showing schematically the main structure of the optical pickup device in the present modification. As shown in FIG. 19, an optical pickup device 400 includes semiconductor lasers 403 and 406, light receiving element groups 409-412, an integrated circuit substrate 413, a collimator lens 414, an objective lens 415, a single plate 421, and a package 422.

The semiconductor lasers 403 and 406 and the light receiving element groups 409-412 are provided on the integrated circuit substrate 413. A diffraction grating 407 is provided within a surface of the single plate 421 that is opposed to the semiconductor lasers 403 and 406. A hologram element 408 is provided within a surface of the single plate 421 that is opposed to the collimator lens 414.

The package 422 has a flat bottom portion and a support portion that supports the single plate 421. The package 422 and the single plate 421 are fixed in the state where the integrated circuit substrate 413 is disposed on the bottom portion of the package 422, and the single plate 421 is supported by the support portion of the package 422.

With this structure, in which the semiconductor lasers and the light receiving elements are provided in one package, it is possible to reduce the size of the optical pickup device, and consequently, it is possible to reduce the size of the recording/reproduction device in which the optical pickup device is loaded. Also, it is possible to reduce the number of components that are controlled in terms of the assembly accuracy of the recording/reproduction device. Accordingly, this structure of the modification improves the assembly accuracy and reduces the cost by simplifying the recording/reproduction device.

It should be noted here that the advantageous effects produced by the above-described embodiments do not change if this structure of the modification is adopted.

(3) Although not mentioned in the above-described embodiments, the term "DVD" used in this document refers to any of DVD, DVD-ROM, DVD-RAM, DVD-R, and DVD-RW, and the term "CD" used in this document refers to any of CD, CD-ROM, CD-R, and CD-RW.

INDUSTRIAL APPLICABILITY

The optical pickup device of the present invention can be used in an optical information processing device that records, reproduces, and deletes information to/from optical information recording mediums.

The invention claimed is:

1. An optical pickup device for recording and reproducing information on either of different optical information recording mediums, using light beams of different wavelengths according to types of the recording mediums, comprising:
  a semiconductor laser element operable to output selectively two light beams of different wavelengths;
  a hologram element operable to diffract light beams reflected from an optical information recording medium;
  six light receiving elements operable to receive light beams diffracted by the hologram element and perform a photoelectric conversion on the received light beams; and
  an output circuit operable to generate a tracking error signal from signals output from the light receiving elements, and output the generated tracking error signal, wherein
  the light beams reflected from the optical information recording mediums have strength centers thereof, respectively at two different points on the hologram element in correspondence with the different wavelengths,
  the hologram element is divided into six areas by a straight line connecting the two strength center points, and by two straight lines that are perpendicular to the straight line and respectively pass the two strength center points, and
  light beams diffracted by the six areas of the hologram element are respectively received by the six light receiving elements in a one-to-one correspondence with each other.

2. The optical pickup device of claim 1, wherein
the output circuit generates the tracking error signal from signals each of which is obtained by adding together signals from light receiving elements, which have received light beams diffracted by a different one of four areas of the hologram element, wherein the hologram element is divided into the four areas by the straight line connecting the two strength center points, and by one of the two straight lines that is perpendicular to the straight line and passes one of the two strength center points in correspondence with a type of one of the optical information recording mediums that is currently reflecting a light beam.

3. The optical pickup device of claim 1 further comprising:
a diffraction grating operable to diffract light beams into 0 order diffracted light beams, +1$^{st}$ order diffracted light beams, and −1$^{st}$ order diffracted light beams, on light paths from the semiconductor laser element to the optical information recording medium; and
three tracking light receiving elements operable to receive diffracted light beams from the hologram element that are generated by the hologram element by diffracting ±1$^{st}$ order diffracted light beams reflected from the optical information recording medium, and perform a photoelectric conversion on the received diffracted light beams, wherein
the ±1$^{st}$ order diffracted light beams are diffracted by three areas of the hologram element and then diffracted light beams output from the three areas enter the three light receiving elements in a one-to-one correspondence with each other, wherein the hologram element is divided into the three areas by the two straight lines that are perpendicular to the straight line connecting the two strength center points and pass the two strength center points, respectively.

4. The optical pickup device of claim 3, wherein
the output circuit generates the tracking error signal from
  (i) a signal that is obtained by adding together signals from light receiving elements, which have received light beams diffracted by four areas of the hologram element, wherein the hologram element is divided into the four areas by the straight line connecting the two strength center points, and by one of the two straight lines that is perpendicular to the straight line and passes one of the two strength center points depending on a type of one of the optical information recording mediums that is currently reflecting a light beam, and (ii) a signal that is obtained by adding together signals from tracking light receiving elements, which have received light beams diffracted by two areas of the hologram element, wherein the hologram element is divided into the two areas by one of the two straight lines that is perpendicular to the straight line and passes one of the two strength center points depending on a type of one of the optical information recording mediums that is currently reflecting a light beam.

5. The optical pickup device of claim 3, wherein
the diffraction grating is divided into a central portion and outer portions by two straight lines that are substantially parallel to each other,
the central portion has higher diffraction efficiency of the 0 order diffracted light beams than the outer portions, and
gratings formed in the outer portions meet the two straight lines obliquely.

6. The optical pickup device of claim 1 further comprising focusing light receiving elements operable to receive $-1^{st}$ order diffracted lights from the hologram element that are generated by the hologram element by diffracting the 0 order diffracted light beams that are generated by the diffraction grating by diffracting the light beams, and to perform a photoelectric conversion on the received $-1^{st}$ order diffracted lights, wherein
the output circuit generates a focus error signal from signals output from the focusing light receiving elements, and outputs the generated focus error signal.

7. The optical pickup device of claim 6, wherein
each of the six areas of the hologram element is divided into two types of partial areas that have different diffraction angles,
the two types of partial areas form beam spots that are symmetrical with respect to a light emission point of the semiconductor laser element, and
the focusing light receiving elements receive light beams to form beam spots that are symmetrical with beam spots formed on the six light receiving elements with respect to the light emission point of the semiconductor laser element.

8. The optical pickup device of claim 4 further comprising a switch circuit that is used to add together:
   (i) for each of four areas of the hologram element, signals from light receiving elements which have received light beams diffracted by the four areas, wherein the hologram element is divided into the four areas by the straight line connecting the two strength center points, and by one of the two straight lines that is perpendicular to the straight line and passes one of the two strength center points depending on a type of one of the optical information recording mediums that is currently reflecting a light beam, and
   (ii) for each of two areas of the hologram element, signals from tracking light receiving elements which have received light beams diffracted by the two areas, wherein the hologram element is divided into the two areas by one of the two straight lines that is perpendicular to the straight line and passes one of the two strength center points depending on a type of one of the optical information recording mediums that is currently reflecting a light beam.

9. The optical pickup device of claim 4, wherein
light receiving elements and tracking light receiving elements, which receive light beams diffracted by an area of the hologram element sandwiched by the two straight lines that are perpendicular to the straight line connecting the two strength center points and respectively pass the two strength center points, are separated into different portions in correspondence with types of the optical information recording mediums.

10. The optical pickup device of claim 1 further comprising a collimator lens operable to collimate the two light beams, wherein
an optical axis of the collimator lens matches a strength center axis of one of the two light beams reflected from the optical information recording medium.

11. The optical pickup device of claim 1, wherein
the light receiving elements and the semiconductor laser element are provided on an integrated circuit substrate.

12. The optical pickup device of claim 11, wherein
the semiconductor laser element is a monolithic 2-wavelength semiconductor laser element, and has been formed on the integrated circuit substrate by a semiconductor process.

13. The optical pickup device of claim 11, wherein
the integrated circuit substrate, the hologram element, and the diffraction grating are loaded in one package.

\* \* \* \* \*